(12) United States Patent
Zhang et al.

(10) Patent No.: US 11,932,392 B2
(45) Date of Patent: **\*Mar. 19, 2024**

(54) SYSTEMS AND METHODS FOR ADJUSTING UAV TRAJECTORY

(71) Applicant: SZ DJI TECHNOLOGY CO., LTD., Shenzhen (CN)

(72) Inventors: Litian Zhang, Shenzhen (CN); Xiao Hu, Shenzhen (CN); Ang Liu, Shenzhen (CN); Guyue Zhou, Shenzhen (CN)

(73) Assignee: SZ DJI TECHNOLOGY CO., LTD., Shenzhen (CN)

(\*) Notice: Subject to any disclaimer, the term of this patent is extended or adjusted under 35 U.S.C. 154(b) by 81 days.

This patent is subject to a terminal disclaimer.

(21) Appl. No.: 17/322,527

(22) Filed: May 17, 2021

(65) Prior Publication Data

US 2022/0055746 A1 Feb. 24, 2022

Related U.S. Application Data

(63) Continuation of application No. 16/109,991, filed on Aug. 23, 2018, now Pat. No. 11,008,098, which is a (Continued)

(51) Int. Cl.
*G05D 1/00* (2006.01)
*B64C 39/02* (2023.01)
*G08G 5/00* (2006.01)

(52) U.S. Cl.
CPC .......... *B64C 39/024* (2013.01); *G05D 1/0011* (2013.01); *G05D 1/0016* (2013.01); (Continued)

(58) Field of Classification Search
CPC ............ B64C 39/024; B64C 2201/141; B64C 2201/146; G05D 1/0011; G05D 1/12; (Continued)

(56) References Cited

U.S. PATENT DOCUMENTS

| 8,212,711 B1 | 7/2012 | Schultz et al. |
| 2005/0231390 A1* | 10/2005 | Crane ............ G01C 23/005 |
| | | 345/660 |

(Continued)

FOREIGN PATENT DOCUMENTS

| CN | 101192064 A | 6/2008 |
| CN | 102591346 A | 7/2012 |

(Continued)

OTHER PUBLICATIONS

The World Intellectual Property Organization (WIPO) International Search Report and Written Opinion for PCT/CN2016/074686 dated Dec. 1, 2016 7 pages.

*Primary Examiner* — Shardul D Patel
(74) *Attorney, Agent, or Firm* — ANOVA LAW GROUP, PLLC

(57) ABSTRACT

A system includes a flight controller. The flight controller is configured to, in response to a first user interface receiving a first user input, generate a first control signal. The first control signal is configured to control an unmanned aerial vehicle (UAV) to effect an autonomous flight with a first flight parameter and a second flight parameter. In response to a second user interface, different from the first user interface, receiving a second user input, the flight controller is further configured to modify the first flight parameter to obtain a modified first flight parameter, generate a second control signal based on the modified first flight parameter and the second flight parameter, and control the UAV to operate based on the second control signal.

20 Claims, 14 Drawing Sheets

Related U.S. Application Data continuation of application No. PCT/CN2016/074686, filed on Feb. 26, 2016.

(52) U.S. Cl.
CPC ......... *G05D 1/0061* (2013.01); *G05D 1/0088* (2013.01); *G05D 1/12* (2013.01); *G08G 5/0039* (2013.01); *G08G 5/0069* (2013.01); *B64U 2201/10* (2023.01); *B64U 2201/20* (2023.01)

(58) Field of Classification Search
CPC .. G05D 1/0088; G05D 1/0061; G05D 1/0016; G05D 1/00; G08G 5/0069; G08G 5/0039
USPC ............................................................ 701/2
See application file for complete search history.

(56) References Cited

U.S. PATENT DOCUMENTS

| | | |
|---|---|---|
| 2006/0271251 A1 | 11/2006 | Hopkins |
| 2007/0106473 A1 | 5/2007 | Bodin et al. |
| 2008/0009983 A1* | 1/2008 | Mottura ............... G05D 1/0055 714/E11.166 |
| 2008/0208395 A1 | 8/2008 | Self et al. |
| 2009/0210109 A1* | 8/2009 | Ravenscroft .......... G01C 21/20 701/25 |
| 2010/0004798 A1* | 1/2010 | Bodin .................. G05D 1/0202 701/25 |
| 2011/0320068 A1 | 12/2011 | Lee et al. |
| 2012/0280087 A1 | 11/2012 | Coffman et al. |
| 2012/0330481 A1 | 12/2012 | Feldkamp et al. |
| 2013/0179009 A1 | 7/2013 | Gershzohn et al. |
| 2013/0210109 A1* | 8/2013 | Lebkowski .......... C12N 5/0607 435/173.9 |
| 2014/0008496 A1 | 1/2014 | Ye et al. |
| 2014/0142784 A1 | 5/2014 | Muren et al. |
| 2015/0316927 A1* | 11/2015 | Kim ....................... G01S 19/00 701/2 |
| 2015/0346725 A1 | 12/2015 | Zygmant et al. |
| 2015/0377405 A1 | 12/2015 | Down et al. |
| 2016/0012393 A1* | 1/2016 | Wang ............... G06Q 10/08355 705/338 |
| 2016/0091894 A1 | 3/2016 | Zhang et al. |
| 2016/0096622 A1* | 4/2016 | Richardson ........... B64C 39/024 701/2 |
| 2016/0180701 A1 | 6/2016 | Golliher |
| 2017/0023938 A1* | 1/2017 | Zang .................... G06F 3/04883 |
| 2017/0025021 A1* | 1/2017 | Song .................... G08G 5/0013 |
| 2017/0060128 A1* | 3/2017 | Matloff .................. G08C 17/02 |
| 2017/0174344 A1 | 6/2017 | Lema et al. |

FOREIGN PATENT DOCUMENTS

| | | |
|---|---|---|
| CN | 102671390 A | 9/2012 |
| CN | 104035446 A | 9/2014 |
| CN | 204178240 U | 2/2015 |
| CN | 104750111 A | 7/2015 |
| CN | 104932526 A | 9/2015 |
| CN | 105334863 A | 2/2016 |
| FR | 3035523 A1 | 10/2016 |
| GB | 2128842 A | 5/1984 |
| IN | 102854886 A | 1/2013 |
| JP | H0519854 A | 1/1993 |
| JP | 2003127994 A | 5/2003 |
| JP | 2004017743 A | 1/2004 |
| JP | 2007237873 A | 9/2007 |
| JP | 2011189929 A | 9/2011 |
| JP | 2012198883 A | 10/2012 |
| JP | 2014019431 A | 2/2014 |
| JP | 2014040231 A | 3/2014 |
| JP | 2015070463 A | 4/2015 |
| JP | 5831893 B1 | 12/2015 |
| JP | 2016203978 A | 12/2016 |
| KR | 101286376 B1 | 7/2013 |
| WO | 9905580 A2 | 2/1999 |
| WO | 2009091431 A1 | 7/2009 |
| WO | 2015140795 A1 | 9/2015 |
| WO | 2015157883 A1 | 10/2015 |
| WO | 2015167080 A1 | 11/2015 |
| WO | 2016015251 A1 | 2/2016 |
| WO | 2016026128 A1 | 2/2016 |

\* cited by examiner

SYSTEMS AND METHODS FOR ADJUSTING UAV TRAJECTORY

CROSS-REFERENCE TO RELATED APPLICATIONS

This application is a continuation of U.S. patent application Ser. No. 16/109,991, filed on Aug. 23, 2018, which is a continuation of International Application No. PCT/CN2016/074686, filed on Feb. 26, 2016, the entire contents of both of which are incorporated herein by reference.

BACKGROUND

Aerial vehicles have a wide range of real-world applications including surveillance, reconnaissance, exploration, logistics transport, disaster relief, aerial photography, large-scale agriculture automation, live video broadcasting, etc. In some applications, an aerial vehicle carrying a payload (e.g., a camera) may be controlled to fly around a target to acquire data or perform certain tasks. With the advancement of sensors and navigation technologies, autonomous flight or control of the aerial vehicles has become possible. The usefulness of aerial vehicles with autonomous flight may be improved.

SUMMARY

Presently, aerial vehicles may fly along a preset trajectory or autonomously planned trajectories during autonomous flight. Examples of autonomous flight may include autonomous return of the aerial vehicles, autonomous navigation of the aerial vehicles along one or more waypoints, and/or autonomous flight to a point of interest. User intervention during the autonomous flight maybe limited, or may disrupt the autonomous flight of the aerial vehicle. In some instances however, ability for the user to quickly intervene or supplement autonomous flight of aerial vehicles may be desired. For example, during an autonomous return flight of the aerial vehicle, user's input may be helpful in avoiding an obstacle such as a building (e.g., if an aerial vehicle had no obstacle avoidance sensors). In addition, in some circumstances, the user may desire the ability to slightly modify a flight of the aerial vehicle while still relying on the autonomous operation of the aerial vehicle in accomplishing a given task. For instance, a user may wish to deviate from a selected target or destination.

Accordingly, a need exists for the ability to modify autonomous flight of aerial vehicles. Such ability may be provided via flight control systems that are intuitive and easy to use, and that allows a human to modify and/or affect an autonomous flight of an aerial vehicle through interaction with a human-system interface. The burden of manually piloting the aerial vehicle on the user can be significantly reduced, while still enabling a degree of control or modification by the user when desired or advantageous.

Thus, in one aspect, a system for modifying autonomous flight of an unmanned aerial vehicle (UAV) is provided. The system comprises: a first user interface configured to receive a first user input, wherein the first user input provides one or more instructions to effect an autonomous flight of the UAV; and a second user interface configured to receive a second user input, wherein the second user input provides one or more instructions to modify the autonomous flight of the UAV.

In another aspect, a method of modifying autonomous flight of an unmanned aerial vehicle (UAV) is provided. The method comprises: receiving a first user input at a first user interface, wherein the first user input provides one or more instructions to effect an autonomous flight of the UAV; and receiving a second user input at a second user interface, wherein the second user input provides one or more instructions to modify the autonomous flight of the UAV.

In another aspect, a non-transitory computer readable medium for modifying flight of an unmanned aerial vehicle (UAV) is provided. The non-transitory computer readable medium comprises code, logic, or instructions to: receive a first user input at a first user interface, wherein the first user input provides one or more instructions to effect an autonomous flight of the UAV; and receive a second user input at a second user interface, wherein the second user input provides one or more instructions to modify the autonomous flight of the UAV.

In another aspect, a system for modifying autonomous flight of an unmanned aerial vehicle (UAV) is provided. The system comprises: a flight controller configured to (1) generate a first set of signals that effect autonomous flight of the UAV in response to a first user input received at a first user interface, and (2) generate a second set of signals that modify the autonomous flight of the UAV in response to a second user input received at a second user interface.

In another aspect, a method of modifying autonomous flight of an unmanned aerial vehicle (UAV) is provided. The method comprises: generating a first set of signals, with aid of a flight controller, that effect autonomous flight of the UAV in response to a first user input received at a first user interface; and generating a second set of signals, with aid of the flight controller, that modify the autonomous flight of the UAV in response to a second user input received at a second user interface.

In another aspect, a non-transitory computer readable medium for modifying flight of an unmanned aerial vehicle (UAV) is provided. The non-transitory computer readable medium comprises code, logic, or instructions to: generate a first set of signals, with aid of a flight controller, that effect autonomous flight of the UAV in response to a first user input received at a first user interface; and generate a second set of signals, with aid of the flight controller, that modify the autonomous flight of the UAV in response to a second user input received at a second user interface.

In another aspect, an unmanned aerial vehicle (UAV) is provided. The UAV comprises: a flight controller configured to generate (1) a first set of signals that instruct autonomous flight of the UAV, wherein the first set of signals are generated based on a first user input received at a first user interface, and (2) a second set of signals that instruct modification of the autonomous flight of the UAV, wherein the second set of signals are generated based on a second user input received at a second user interface; and one or more propulsion units configured to (a) effect the autonomous flight of the UAV in response to the first set of signals, and (b) modify the autonomous flight of the UAV in response to the second set of signals.

In another aspect, a system for modifying flight of an unmanned aerial vehicle (UAV) is provided. The system comprises: one or more processors, individual or collectively configured to: effect an autonomous flight of the UAV, wherein the autonomous flight comprises an autonomous flight path; and modify the autonomous flight path in response to a user input, wherein the autonomous flight path is modified while maintaining the autonomous flight.

In another aspect, a method for modifying flight of an unmanned aerial vehicle (UAV) is provided. The method comprises: effecting an autonomous flight of the UAV, wherein the autonomous flight comprises an autonomous flight path; and modifying the autonomous flight path in response to a user input, wherein the autonomous flight path is modified while maintaining the autonomous flight.

In another aspect, a non-transitory computer readable medium for modifying flight of an unmanned aerial vehicle (UAV) is provided. The non-transitory computer readable medium comprises code, logic, or instructions to: effect an autonomous flight of the UAV, wherein the autonomous flight comprises an autonomous flight path; and modify the autonomous flight path in response to a user input, wherein the autonomous flight path is modified while maintaining the autonomous flight.

In another aspect, an unmanned aerial vehicle (UAV) is provided. The UAV comprises: a flight controller configured to generate (1) a first set of signals for autonomous flight of the UAV, wherein the autonomous flight comprises an autonomous flight path, and (2) a second set of signals for modification of the autonomous flight path, wherein the autonomous flight path is modified while maintaining the autonomous flight; and one or more propulsion units configured to (a) effect the autonomous flight of the UAV in response to the first set of signals, and (b) modify the autonomous flight path of the UAV in response to the second set of signals.

It shall be understood that different aspects of the disclosure can be appreciated individually, collectively, or in combination with each other. Various aspects of the disclosure described herein may be applied to any of the particular applications set forth below or for any other types of movable objects. Any description herein of an aerial vehicle may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
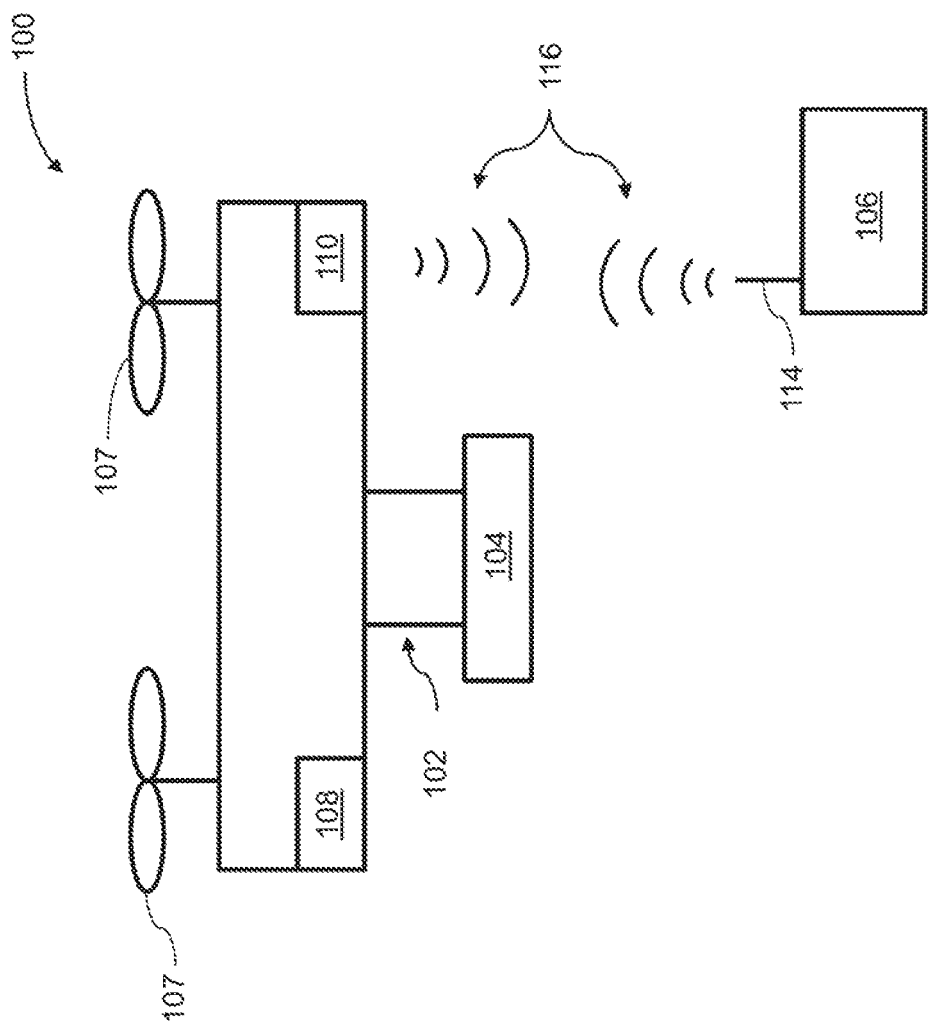
FIG. 1 shows an example of a system used for navigation, in accordance with embodiments.

Systems, methods, and devices provided herein can be used to give an operator the ability to affect and/or modify flight of an autonomously operating aerial vehicle. For example, a user input device may be provided that is intuitive and easy to use. The user input device may be utilized to modify a flight of the aerial vehicle during autonomous operation of the aerial vehicle. In some instances, the autonomously operating vehicle may have a predetermined goal. For example, the autonomously operating vehicle may have a predetermined task it is set out to accomplish, or a target it is heading towards. Accordingly, the autonomously operating vehicle may continue in accomplishing its predetermined task, or continue heading towards its target while its parameters, such as flight path and/or flight direction, is modified according to the user input. In some instances, a threshold for modification permitted by a user may be provided in order to ensure that the aerial vehicle is able to accomplish its task or arrive at the destination under autonomous control despite the user input.

In some instances, different user interfaces may be provided for accepting different types of user inputs. The different user interfaces may include hardware and/or software interfaces. For example, the different user interfaces may include a physical button on a device or interactive buttons displayed on a screen. In some instances, the different user interfaces may comprise two different user interfaces. For example, a first user interface may be provided that can be used to improve the ease of autonomous operation of the aerial vehicles. The first user interface may allow control of an aerial vehicle through interaction with a graphical human system interface and significantly reduce burden of manually piloting the aerial vehicle. The first user interface may be used in providing the aerial vehicle with autonomous tasks to accomplish. In some instances, the autonomous tasks to accomplish may be designated with simple commands (e.g., touching a target on a map). A second user interface may be provided that allows simple and intuitive modification of the autonomous operation (e.g., autonomous flight) of the aerial vehicle. For example, while the aerial vehicle is autonomously navigating towards its target, user input on the second user interface may slightly modify a trajectory of the aerial vehicle. In some instances, the user input provided on the second user interface may modify parameters of the autonomous flight while the autonomous flight of the aerial vehicle is maintained.

The ability to affect and/or modify flight of an autonomously operating aerial vehicle may improve maneuverability of the aerial vehicles under autonomous control. The burden of manually piloting the aerial vehicle on a user can be significantly reduced, yet adjustments (e.g., modifications) on autonomous flight may be allowed such that where desired or beneficial, the user can affect, or modify, the autonomous flight. The separate functionalities provided on different user interfaces may simplify control such that both skilled, and unskilled users may take advantage of the benefits enabled by the disclosure provided herein. In addition, the separate functionalities provided on different user interfaces may ensure that quick actions can be taken to modify autonomous flight of the aerial vehicles in emergencies or unexpected situations (e.g., at the second user interface) without confusion or error.

The ability to modify autonomous flight may be particularly useful when there are obstacles encountered by the aerial vehicle that is undetected (e.g., through error or if the aerial vehicle lacks obstacle sensors) which is noticed by a user. In such cases, slight modifications may be made to the UAV flight without disrupting autonomous operation of the aerial vehicle such that a given task may continue to be accomplished after the modification. In some instances, the ability to modify autonomous flight may be particularly useful if the user desires a degree of deviation from a given flight path while maintaining autonomous flight towards a target destination (e.g., the user sees something interesting). Flight path as used herein may refer to a path the aerial vehicle takes during flight. In some instances, the flight path may refer to a trajectory of the aerial vehicle or a flight direction of the aerial vehicle (e.g., in two-dimensional or three-dimensional coordinates). In some instances, the flight path may refer to a preconfigured flight path (e.g., trajectory) which the aerial vehicle is set to follow. In some instances, the flight path may refer to an instantaneous flight direction of the aerial vehicle.

The user input may affect and/or modify a flight path of the aerial vehicle by adding a directional component to the flight path, and/or adding a velocity or acceleration component to the aerial vehicle. In some instances, the ability to modify autonomous flight may be particularly useful if the user desires the UAV to fly in certain flight patterns or to perform maneuverings (e.g., making the UAV fly in an ascending or descending spiral) that are not easily implemented. It should be noted that the ability to modify autonomous flight can be incorporated into any type of aerial vehicle, as well as any vehicle that is capable of traversing air, water, land, and/or space.

It shall be understood that different aspects of the disclosure can be appreciated individually, collectively, or in combination with each other. Various aspects of the disclosure described herein may be applied to any of the particular applications set forth below or for any other types of remotely controlled vehicles or movable objects.

FIG. 1 shows an example of a system used for navigation, in accordance with embodiments. The navigation system may include a movable object 100 and a user terminal 106 capable of communicating with the movable object. The movable object may be configured to carry a payload 104. The user terminal may be used to control one or more motion characteristics of the movable object and/or the payload. For example, the user terminal can be used to control the movable object such that the movable object is able to navigate to a target area. The user terminal may be used to give the movable object instructions or commands that are transmitted to the movable object (e.g., a flight controller of the movable object) that effects autonomous flight of the movable object as further described herein. In some instances, the user terminal may be used to manually control the movable object and/or modify parameters of the movable object while the movable object is autonomously operating.

The movable object 100 may be any object capable of traversing an environment. The movable object may be capable of traversing air, water, land, and/or space. The environment may include objects that are incapable of motion (stationary objects) and objects that are capable of motion. Examples of stationary objects may include geographic features, plants, landmarks, buildings, monolithic structures, or any fixed structures. Examples of objects that are capable of motion include people, vehicles, animals, projectiles, etc.

In some cases, the environment may be an inertial reference frame. The inertial reference frame may be used to describe time and space homogeneously, isotropically, and in a time-independent manner. The inertial reference frame may be established relative to the movable object, and move in accordance with the movable object. Measurements in the inertial reference frame can be converted to measurements in another reference frame (e.g., a global reference frame) by a transformation (e.g., Galilean transformation in Newtonian physics).

The movable object 100 may be a vehicle. The vehicle may be a self-propelled vehicle. The vehicle may traverse an environment with aid of one or more propulsion units 107. The vehicle may be an aerial vehicle, a land-based vehicle, a water-based vehicle, or a space-based vehicle. The vehicle may be an unmanned vehicle. The vehicle may be capable of traversing an environment without a human passenger onboard. Alternatively, the vehicle may carry a human passenger. In some embodiments, the movable object may be an unmanned aerial vehicle (UAV).

Any description herein of a UAV or any other type of movable object may apply to any other type of movable object or various categories of movable objects in general, or vice versa. For instance, any description herein of a UAV may apply to any unmanned land-bound, water-based, or space-based vehicle. Further examples of movable objects are provided in greater detail elsewhere herein.

As mentioned above, the movable object may be capable of traversing an environment. The movable object may be capable of flight within three dimensions. The movable object may be capable of spatial translation along one, two, or three axes. The one, two or three axes may be orthogonal to one another. The axes may be along a pitch, yaw, and/or roll axis. The movable object may be capable of rotation about one, two, or three axes. The one, two, or three axes may be orthogonal to one another. The axes may be a pitch, yaw, and/or roll axis. The movable object may be capable of movement along up to 6 degrees of freedom. The movable object may include one or more propulsion units that may aid the movable object in movement. For instance, the movable object may be a UAV with one, two or more propulsion units. The propulsion units may be configured to generate lift for the UAV. The propulsion units may include rotors. The movable object may be a multi-rotor UAV.

The movable object may have any physical configuration. For instance, the movable object may have a central body with one or arms or branches extending from the central body. The arms may extend laterally or radially from the central body. The arms may be movable relative to the central body or may be stationary relative to the central body. The arms may support one or more propulsion units. For instance, each arm may support one, two or more propulsion units.

The movable object may have a housing. The housing may be formed from a single integral piece, two integral pieces, or multiple pieces. The housing may include a cavity within where one or more components are disposed. The components may be electrical components, such as a motion controller (e.g., a flight controller), one or more processors, one or more memory storage units, one or more sensors (e.g., one or more inertial sensors or any other type of sensor described elsewhere herein), one or more navigational units (e.g., a global positioning system (GPS) unit), one or communication units, or any other type of component. The housing may have a single cavity or multiple cavities. In some instances, a motion controller (such as a flight controller) may be in communication with one or more propulsion units and/or may control operation of the one or more propulsion units. The motion controller (or flight controller) may communicate and/or control operation of the one or more propulsion units with aid of one or more electronic speed control (ESC) modules. The motion controller (or flight controller) may communicate with the ESC modules to control operation of the propulsion units.

The movable object may support an on-board payload 104. The payload may have a fixed position relative to the movable object, or may be movable relative to the movable object. The payload may spatially translate relative to the movable object. For instance, the payload may move along one, two or three axes relative to the movable object. The payload may rotate relative to the movable object. For instance, the payload may rotate about one, two or three axes relative to the movable object. The axes may be orthogonal to on another. The axes may be a pitch, yaw, and/or roll axis. Alternatively, the payload may be fixed or integrated into the movable object.

The payload may be movable relative to the movable object with aid of a carrier 102. The carrier may include one or more gimbal stages that may permit movement of the carrier relative to the movable object. For instance, the carrier may include a first gimbal stage that may permit rotation of the carrier relative to the movable object about a first axis, a second gimbal stage that may permit rotation of the carrier relative to the movable object about a second axis, and/or a third gimbal stage that may permit rotation of the carrier relative to the movable object about a third axis. Any descriptions and/or characteristics of carriers as described elsewhere herein may apply.

The payload may include a device capable of sensing the environment about the movable object, a device capable of emitting a signal into the environment, and/or a device capable of interacting with the environment.

One or more sensors may be provided as a payload, and may be capable of sensing the environment. The one or more sensors may include an imaging device. An imaging device may be a physical imaging device. An imaging device can be configured to detect electromagnetic radiation (e.g., visible, infrared, and/or ultraviolet light) and generate image data based on the detected electromagnetic radiation. An imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., grayscale, black-and-white, sepia). The imaging device may include a lens configured to direct light onto an image sensor.

The imaging device can be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like. The camera may be a thermal imaging device when it is configured to capture infrared images.

In some embodiments, the payload may include multiple imaging devices, or an imaging device with multiple lenses and/or image sensors. The payload may be capable of taking multiple images substantially simultaneously. The multiple images may aid in the creation of a 3D scene, a 3D virtual environment, a 3D map, or a 3D model. For instance, a right image and a left image may be taken and used for stereo-mapping. A depth map may be calculated from a calibrated binocular image. Any number of images (e.g., 2 or more, 3 or more, 4 or more, 5 or more, 6 or more, 7 or more, 8 or more, 9 or more) may be taken simultaneously to aid in the creation of a 3D scene/virtual environment/model, and/or for depth mapping. The images may be directed in substantially the same direction or may be directed in slightly different directions. In some instances, data from other sensors (e.g., ultrasonic data, LIDAR data, data from any other sensors as described elsewhere herein, or data from external devices) may aid in the creation of a 2D or 3D image or map.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. In some embodiments, the camera may be a 4K camera or a camera with a higher resolution.

The imaging device may capture a sequence of images at a specific capture rate. In some embodiments, the sequence of images may be captured standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, unobvious surface texture of environment).

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light.

In some alternative embodiments, an imaging device may extend beyond a physical imaging device. For example, an imaging device may include any technique that is capable of capturing and/or generating images or video frames. In some embodiments, the imaging device may refer to an algorithm that is capable of processing images obtained from another physical device.

A payload may include one or more types of sensors. Some examples of types of sensors may include location sensors (e.g., global positioning system (GPS) sensors, mobile device transmitters enabling location triangulation), motion sensors, vision sensors (e.g., imaging devices capable of detecting visible, infrared, or ultraviolet light, such as cameras), proximity or range sensors (e.g., ultrasonic sensors, lidar, time-of-flight or depth cameras), inertial sensors (e.g., accelerometers, gyroscopes, and/or gravity detection sensors, which may form inertial measurement units (IMUs)), altitude sensors, attitude sensors (e.g., compasses), pressure sensors (e.g., barometers), temperature sensors, humidity sensors, vibration sensors, audio sensors (e.g., microphones), and/or field sensors (e.g., magnetometers, electromagnetic sensors, radio sensors).

The sensing data provided by the sensors may be used to control the spatial disposition, velocity, and/or orientation of the movable object (e.g., using a suitable processing unit and/or control module, as described below). Alternatively, the sensors may be used to provide data regarding the environment surrounding the movable object, such as weather conditions, proximity to potential obstacles, location of geographical features, location of manmade structures, and the like.

The payload may include one or more devices capable of emitting a signal into an environment. For instance, the payload may include an emitter along an electromagnetic spectrum (e.g., visible light emitter, ultraviolet emitter, infrared emitter). The payload may include a laser or any other type of electromagnetic emitter. The payload may emit one or more vibrations, such as ultrasonic signals. The payload may emit audible sounds (e.g., from a speaker). The payload may emit wireless signals, such as radio signals or other types of signals.

The payload may be capable of interacting with the environment. For instance, the payload may include a robotic arm. The payload may include an item for delivery, such as a liquid, gas, and/or solid component. For example, the payload may include pesticides, water, fertilizer, fire-repellent materials, food, packages, or any other item.

Any examples herein of payloads may apply to devices that may be carried by the movable object or that may be part of the movable object. For instance, one or more sensors 108 may be part of the movable object. The one or more sensors may or may be provided in addition to the payload. This may apply for any type of payload, such as those described herein.

The movable object may be capable of communicating with the user terminal 106. The user terminal may communicate with the movable object itself, with a payload of the movable object, and/or with a carrier of the movable object, wherein the carrier is used to support the payload. Any description herein of communications with the movable object may also apply to communications with the payload of the movable object, the carrier of the movable object, and/or one or more individual components of the movable object (e.g., communication unit, navigation unit, propulsion units, power source, processors, memory storage units, and/or actuators).

The communications between the movable object and the user terminal may be via wireless communications 116. For example, a communication system 110 may be provided on the movable object. A corresponding communication unit 114 may be provided on the user terminal and may be used to form a communication link (e.g., wireless communication link) between the communication systems. Direct communications may be provided between the movable object and the user terminal. The direct communications may occur without requiring any intermediary device or network. Indirect communications may be provided between the movable object and the user terminal. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof.

The user terminal may be any type of external device. The user terminal may individually, or collectively refer to a device configured to receive input from a user. The user terminal may configure one or more user interfaces configured to receive user inputs. Examples of user terminals may include, but are not limited to, smartphones/cellphones, tablets, personal digital assistants (PDAs), laptop computers, desktop computers, media content players, video gaming station/system, virtual reality systems, augmented reality systems, wearable devices (e.g., watches, glasses, gloves, headgear (such as hats, helmets, virtual reality headsets, augmented reality headsets, head-mounted devices (HMD), headbands), pendants, armbands, leg bands, shoes, vests), gesture-recognition devices, microphones, any electronic device capable of providing or rendering image data, remote controllers with control sticks, or any other type of device. The user terminal may be a handheld object. The user terminal may be portable. The user terminal may be carried by a human user. In some cases, the user terminal may be located remotely from a human user, and the user can control the user terminal using wireless and/or wired communications. Various examples, and/or characteristics of user terminals are provided in greater detail elsewhere herein.

The user terminals may include one or more processors that may be capable of executing non-transitory computer readable media that may provide instructions for one or more actions. The user terminals may include one or more memory storage devices comprising non-transitory computer readable media including code, logic, or instructions for performing the one or more actions. The user terminal may include software applications that allow the user terminal to communicate with and receive imaging data from a movable object. The user terminals may include a communication unit 114, which may permit the communications with the movable object. In some instances, the communication unit may include a single communication module, or multiple communication modules. In some instances, the user terminal may be capable of interacting with the movable object using a single communication link or multiple different types of communication links. The user terminal may be used to control movement of the movable object. In some instances, the user terminal may be configured to effect autonomous operation (e.g., autonomous flight) of the movable device, e.g., in response to a user input. In some instances, the user terminal may be configured to effect and/or modify the autonomous operation of the movable device, as further described below. In some instances, the user terminal may optionally be used to control any component of the movable object (e.g., operation of the payload, operation of the carrier, one or more sensors, communications, navigation, landing stand, actuation of one or more components, power supply control, or any other function).

The user terminal may comprise one or more user interfaces which may be provided on one or more devices. For example, the user terminal may comprise one, two, three, four, five, six, seven, eight, nine, ten, or more user interfaces. A user interface may refer to an interface where inputs by a user (e.g., an operator of the UAV) is received. The input may be of any type. For example, the user may provide an input by simply touching a portion (e.g., capacitive touchscreen) of the user interface. For example, the user may actuate a mechanism (e.g., keyboard, mouse, button, joysticks, etc) on the user interface to provide the user input. In some instances, the user may provide an auditory signal (e.g., voice command) to the user interface which is received by the user interface. In some instances, the user interface may be configured to sense, follow, or track movement of the user (e.g., eye movement, hand gesture, etc) in order to receive the user input. In some instances the user interface may be configured to receive differing degrees of user input. For example, the user may exert differing amounts of force or actuate mechanisms on the user interface to differing degrees which may be appropriately interpreted by the user interface (or one or more processors coupled to the user interface). For example, the user may provide input for differing amounts of duration which may be appropriately interpreted by the user interface (or one or more processors coupled to the user interface). Alternatively or in addition, the user input may be configured to receive and interpret user inputs as a binary input. For example, a user touching the user interface may be interpreted as a command effect flight of the movable object towards a target. Each of the user interfaces may be provided on a separate device. Alternatively, two, three, four, five, or more user interfaces may be provided on a single device.

In some instances, different user interfaces may be configured to control different functionalities of the movable object and/or to control different components of the movable objects. For example, a first user terminal may be used for effecting autonomous operation of the movable object while a second user terminal may be used for modifying (e.g., effecting) the autonomous operation. In some instances, different devices may be configured to control different functionalities of the movable object and/or to control different components of the movable objects. The different user interfaces and/or devices may or may not be in communication with one another. For example, different devices may be in communication with one another via wireless or wired communication links. Alternatively, each of the different devices may not be in communication with one another but separately communicate with the UAV.

Figure 2:
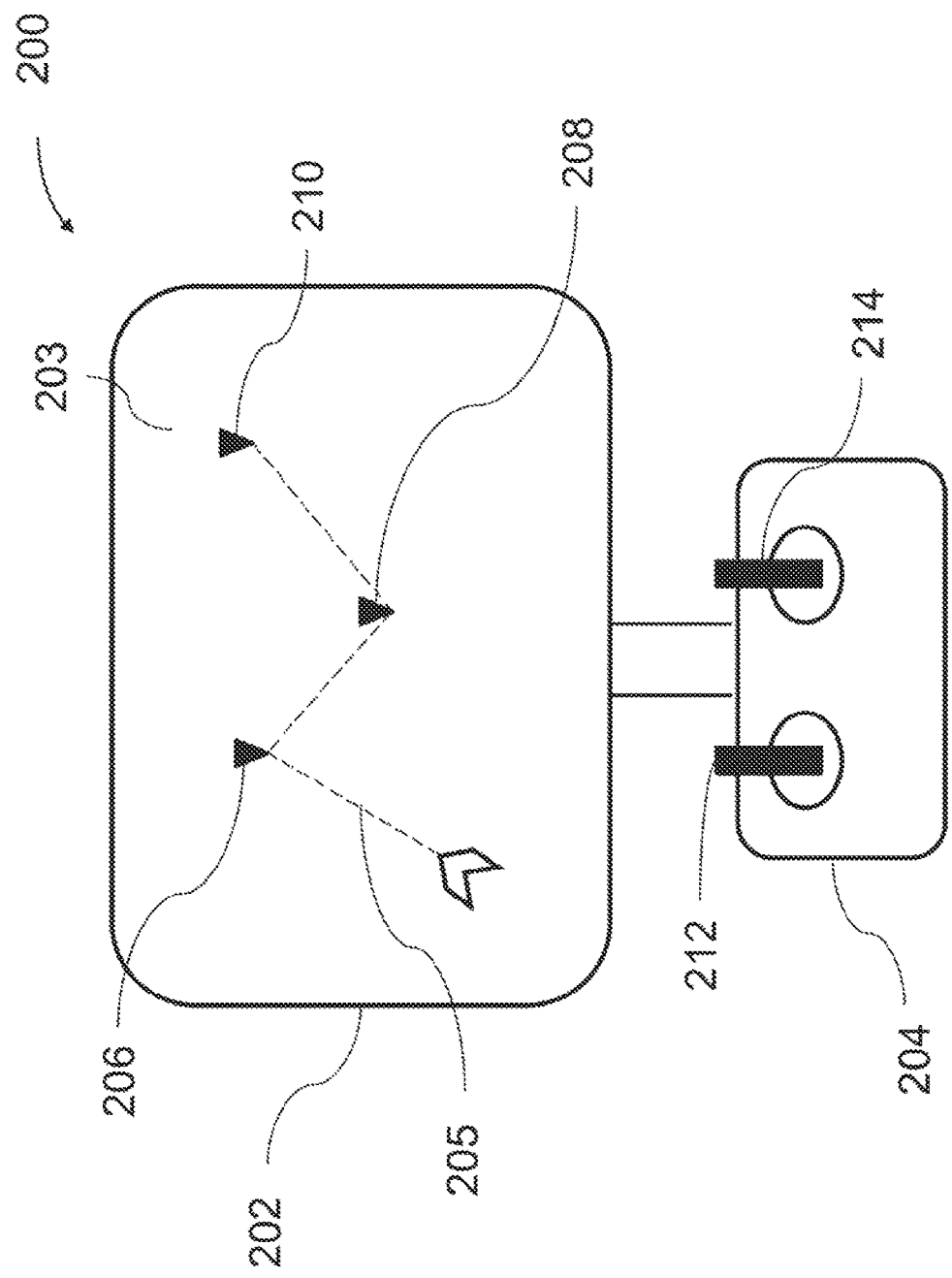
FIG. 2 illustrates a user terminal, in accordance with embodiments.

FIG. 2 illustrates a user terminal 200, in accordance with embodiments. The user terminal may comprise one or more user interfaces. User interface may be configured to receive inputs by a user (e.g., an operator of the UAV). The user may be an operator of the movable object. Each of the user interfaces may be provided on a single device. Alternatively, different user interfaces may be provided on different devices, and the user terminal may comprise two or more devices. The user terminal may be configured to receive user input and generate and/or provide instructions (e.g., signals) that are sent to the movable object and/or payload. In some instances, a single input may be received at the user terminal that generates instructions for effecting autonomous flight of the movable object. For example, a target may be designated on the user terminal and instructions may be generated and sent to the movable object (e.g., a flight controller of the movable object) such that the movable object autonomously moves towards the target. In some instances, a user input may be received at the user terminal to affect or modify the autonomous operation of the movable object. For example, the user terminal may be used to manually control movement of the movable object and/or used to modify a flight (e.g., autonomous flight) of the movable object.

In some instances, the user terminal may comprise a first user interface 202 and a second user interface 204. The first user interface and the second user interface may have different characteristics and may be used to implement different functionalities for the movable object. For example, the first user interface may be configured to receive user input that effects autonomous operation (e.g., autonomous flight) of the movable object. In some instances, the first user interface may be configured to receive user inputs that instruct the movable object to autonomously accomplish a certain task or autonomously move towards a target. A single input, or a discrete number of inputs may be sufficient to instruct the movable object to autonomously operate (e.g., autonomously fly). Continuous monitoring or supervision of the movable object by the user may not be necessary when utilizing the first user interface.

The first user interface 202 may comprise a display 203. The display may be a screen. The display may or may not be a touchscreen. The display may be a light-emitting diode (LED) screen, OLED screen, liquid crystal display (LCD) screen, plasma screen, or any other type of screen. The display may be configured to show an image. The image on the display may show a view collected with aid of a payload of the movable object. For instance, an image collected by the imaging device may be shown on the display. In some instances, the image collected by the imaging device may be considered a first person view (FPV) image. In some instances, a single imaging device may be provided and a single FPV may be provided. Alternatively, multiple imaging devices having different fields of view may be provided. The views may be toggled between the multiple FPVs, or the multiple FPVs may be shown simultaneously. The multiple FPVs may correspond to (or generated by) different imaging devices, which may have different field of views.

In another example, the image on the display may show a map that may be generated with aid of information from a payload of the movable object. The map may optionally be generated with aid of multiple imaging devices (e.g., right camera, left camera, or more cameras), which may utilize stereo-mapping techniques. In some instances, the map may be generated based on positional information about the movable object relative to the environment, the imaging device relative to the environment, and/or the movable object relative to the imaging device. Positional information may include posture information, spatial location information, angular velocity, linear velocity, angular acceleration, and/or linear acceleration. The map may be optionally generated with aid of one or more additional sensors, as described in greater detail elsewhere herein. The map may be a two-dimensional map or a three-dimensional map. In some instances, the two-dimensional map may show a top-down view map. In some instances, the two-dimensional map may be a topographic map that shows various natural and man-made features. In some instances, the two-dimensional map may be a profile map (e.g., showing an elevation). In some instances, the views may be toggled (e.g., between the topographical map and profile map). In some instances, the views may be toggled between a two-dimensional and a three-dimensional map view, or the two-dimensional and three-dimensional map views may be shown simultaneously. The views may be toggled between one or more FPV and one or more map view, or the one or more FPV and one or more map view may be shown simultaneously.

In some embodiments, the image may be provided in a 3D virtual environment that is displayed on the first user interface (e.g., virtual reality system or augmented reality system). The 3D virtual environment may optionally correspond to a 3D map. The virtual environment may comprise a plurality of points or objects that can be manipulated by a user. The user can manipulate the points or objects through a variety of different actions in the virtual environment. Examples of those actions may include selecting one or more points or objects, drag-and-drop, translate, rotate, spin, push, pull, zoom-in, zoom-out, etc. Any type of movement action of the points or objects in a three-dimensional virtual space may be contemplated.

The first user interface may comprise a graphical user interface (GUI). The GUI may show an image that may permit a user to control actions of the movable object. The GUI may show an image that permits a user to instruct the movable object to autonomously operate or accomplish given tasks. For example, the user may be able to select a target to track, select an area (e.g., predetermined area or a point of interest) to navigate towards, select one or more waypoints that the movable object is to navigate across, have the movable object return to the user (e.g., user terminal), etc. In some instances, the user may be able to instruct the movable object to accomplish the tasks simply by touching or tapping a point (e.g., portion) on the first user interface. In some instances, the first user interface may comprise a capacitive touch screen. The first user interface may enable a tap and go function for the movable object. By simply tapping on the first user interface (e.g., a desired location on a map displayed on the first user interface), the movable object may be instructed to autonomously operate towards the tapped object and/or area. For example, for an image on the display that shows a view collected with aid of a payload of the movable object, a user tapping on an object of interest may instruct the movable object to autonomously follow, or track the object. For example, for an image on the display that shows a map (e.g., 2D or 3D map), a user tapping on a location on the map may instruct the movable object to autonomously navigate towards the tapped location.

In some instances, a target may be selected by a user at the first user interface. The target may be selected within the image (e.g., of the display). The user may also select a portion of the image (e.g., point, region, and/or object) to define the target and/or direction. The user may select the target by directly touching the screen (e.g., touchscreen). The user may touch a portion of the screen. The user may touch the portion of the screen by touching a point on the screen. The user may select the target by selecting the portion of the image with aid of a user interactive device (e.g., mouse, joystick, keyboard, trackball, touchpad, button, verbal commands, gesture-recognition, attitude sensor, thermal sensor, touch-capacitive sensors, or any other device). A touchscreen may be configured to detect location of the user's touch, length of touch, pressure of touch, and/or touch motion, whereby each of the aforementioned manner of touch may be indicative of a specific input command from the user.

The movable object may be configured to travel toward, navigate around, and/or visually track the target. The target may be a target destination. In some instances, the target destination may be locations selected on an image (e.g., FPV image) captured by an imaging device on board the movable object. For example, a location (or locations) may be selected by a user on an image (e.g., FPV image) captured by an imaging device, e.g., by touching points on the image. Such tapping on portions of the image may instruct the movable object to fly to the location with a flight path. In some instances, the target destination may be locations selected on a map. For example, locations 206, 208, and 210 may comprise targets that have been selected by a user on a map. The target may be selected for example, by touching points on the map substantially as described above. Such tapping on portions of the map may instruct the movable object to fly (e.g., autonomously) to the target with a flight path. Such tapping on portions of the user interface to instruct the movable object to autonomously fly towards the target (e.g., locations or objects) may herein be referred to as a tap to go function. In some instances, the target destination may be pre-determined or pre-configured destinations selected without aid of an image or a map, e.g., from a predetermined list, as a standalone feature, etc. For example, the target destination may be locations of the user terminal, location of the user, designated way points, or points of interest (e.g., home as designated by the user).

In some instances, the target may be a target object. The target object may be a stationary target or a moving target. In some instances, the user may specify whether the target is a stationary or moving target. Alternatively, the user may provide any other type of indicator of whether the target is a stationary or moving target. Alternatively, no indication may be provided, and a determination may be automatically made with aid of one or more processors, optionally without requiring user input whether the target is a stationary target or a moving target. A target object may be classified as a stationary target or a moving target depending on its state of motion. In some cases, a target object may be moving or stationary at any given point in time. When the target object is moving, the target object may be classified as a moving target. Conversely, when the same target object is stationary, the target object may be classified as a stationary target.

A stationary target may remain substantially stationary within an environment. Examples of stationary targets may include, but are not limited to landscape features (e.g., trees, plants, mountains, hills, rivers, streams, creeks, valleys, boulders, rocks, etc.) or manmade features (e.g., structures, buildings, roads, bridges, poles, fences, unmoving vehicles, signs, lights, etc.). Stationary targets may include large targets or small targets. A user may select a stationary target. The stationary target may be recognized. Optionally, the stationary target may be mapped. The movable object may travel to and/or navigate around the stationary target, and/or track the stationary object. In some instances, the stationary target may correspond to a selected portion of a structure or object. For example, the stationary target may correspond to a particular section (e.g., top floor) of a skyscraper.

A moving target may be capable of moving within the environment. The moving target may always be in motion, or may be at motions for portions of a time. The moving target may move in a fairly steady direction or may change direction. The moving target may move in the air, on land, underground, on or in the water, and/or in space. The moving target may be a living moving target (e.g., human, animal) or a non-living moving target (e.g., moving vehicle, moving machinery, object blowing in wind or carried by water, object carried by living target). The moving target may include a single moving object or a group of moving objects. For instance, the moving target may include a single human or a group of moving humans. Moving targets may be large targets or small targets. A user may select a moving target. The moving target may be recognized. Optionally, the moving target may be mapped. The movable object may travel to and/or navigate around the moving target and/or track the moving object. A flight path may be planned for the movable object to navigate around the moving object. The path may be changed or updated as the moving object moves along the path. Alternatively, the movable object may travel to and/or navigate around the stationary object and/or visually track the moving object without requiring a planned path.

A moving target may be any object configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments.

A moving target may be capable of moving freely within the environment with respect to six degrees of freedom (e.g., three degrees of freedom in translation and three degrees of freedom in rotation). Alternatively, the movement of the moving target can be constrained with respect to one or more degrees of freedom, such as by a predetermined path, track, or orientation. The movement can be actuated by any suitable actuation mechanism, such as an engine or a motor. The actuation mechanism of the moving target can be powered by any suitable energy source, such as electrical energy, magnetic energy, solar energy, wind energy, gravitational energy, chemical energy, nuclear energy, or any suitable combination thereof. The moving target may be self-propelled via a propulsion system, such as described further below. The propulsion system may optionally run on an energy source, such as electrical energy, magnetic energy, solar energy, wind energy, gravitational energy, chemical energy, nuclear energy, or any suitable combination thereof.

In some instances, the moving target can be a vehicle, such as a remotely controlled vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

Selecting a target as described above may effect autonomous flight of the movable object. For example, selecting a target may generate instructions that are sent to a flight controller of the movable object, e.g., via the communications systems. The flight controller may receive the instructions and further generate signals to effect autonomous flight of the movable object. The autonomous flight may be autonomous flight towards the target. As described herein, the target may be a target destination (e.g., location) and/or target object. In some instances, a plurality of targets may be selected and the movable object may fly along the targets. A movable object under autonomous operation (e.g., via the received input at the first user interface) may comprise a predetermined flight speed at which it moves. The predetermined flight speed may be a default speed. In some instances, the predetermined flight speed may be user configurable. In some instances, the predetermined flight speed may be equal to or less than about 2 m/s, 4 m/s, 6 m/s, 8 m/s, 10 m/s, 12 m/s, 15 m/s, 20 m/s, or 50 m/s.

An object under autonomous operation (e.g., via the received input at the first user interface) may comprise a trajectory, or a flight path. An autonomous flight may comprise an autonomous flight path for the movable object. In some cases, a flight path 205 of the autonomous flight may be displayed in the GUI. Alternatively or in addition, a plurality of points 206, 208, 210 that are indicative of targets towards which the movable object is autonomously flying towards may be displayed in the GUI. The targets may indicate a target object and/or target areas the movable object is autonomously flying towards. In some instances, the flight path may comprise a preset direction, preset trajectory, autonomously planned trajectory, and/or a user configured trajectory. In some instances, the flight path may be preset (e.g., take the shortest route at a certain altitude). In some instances, the flight path may be selected by the user (e.g., from a number of different pre-configured flight paths). In some instances, a user may generate a flight path for the movable object by drawing a contour on the screen, e.g., with a user interactive device or user appendage, substantially as described above. In some instances, the flight path may be generated autonomously or semi-autonomously. In some instances, the flight path may be generated relative to a target by taking into account a position, orientation, attitude, size, shape, and/or geometry of the target. In some instances, the flight path may be generated autonomously or semi-autonomously taking into account other parameters such as parameters of the movable object (e.g., size, weight, velocity, etc), jurisdictional parameters (e.g., laws and regulations), or environmental parameters (e.g., wind conditions, visibility, obstacles, etc). In some instances, the user may modify any portion of the flight path by adjusting (e.g., moving) different spatial points of the motion path on the screen (e.g., on the first user interface). Alternatively, the user may select a region on a screen from a pre-existing set of regions, or may draw a boundary for a region, a diameter of a region, or specify a portion of the screen in any other way.

The movable object may travel along the flight path until a countermanding instruction is received or when a countermanding condition is realized. For instance, the movable object may automatically travel along the motion path until a new path is input, when a portion of the motion path is changed, or when a new target is input. The movable object may travel along the flight path until a different flight path is selected. In some instances, the user may take manual control over the motion of the movable object at any time while it is moving.

The user terminal may optionally comprise a second user interface 204. In some instances, the second user interface may be different from the first user interface. In some instances, the second user interface may be of a different type than the first user interface and/or may be configured to receive different modes of user input. In some instances, the second user interface may comprise one or more mechanisms 212, 214 where user input is received. The one or more mechanisms may be capable of being actuated. The one or more mechanisms may include any type of hardware mechanism such as control sticks, physical buttons, or scroll wheels. In some instances, the one or more mechanisms may include software mechanisms, e.g., interactive buttons on a touch screen. While control sticks are primarily described herein, it is to be understood that the use of other mechanisms (e.g., buttons, etc) may be equally applicable.

Control sticks may also be referred to as joy sticks (or joysticks). In some instances, the one or more control sticks may comprise a roll stick configured to affect rotation of the UAV about a roll axis and/or a yaw stick configured to affect a rotation of the UAV about a yaw axis. In some instances, the one or more control sticks may comprise a pitch stick. The pitch stick may be configured to affect change in a velocity of the UAV. In some instances, the one or more control sticks may comprise a throttle stick. The throttle stick may be configured to affect a change in a height (e.g., altitude) of the UAV. In some instances, the second user interface may be used to control movement of the movable object. The second user interface may be used to directly control motion of the movable object. Alternatively or in addition, the second user interface may be used to modify movement (e.g., flight) of the movable object that is under autonomous control. In some instances, the second user interface may be used to effect autonomous flight of the UAV.

While control sticks may be designated with certain names (e.g., pitch stick, yaw stick, etc), it is to be understood that the designations of the control sticks are arbitrary. For example, the user terminal (e.g., the second user interface) may be able operate under different modes. For example, the user terminal may operate under different modes with a given command from a user, e.g., actuation of a switch). Under different modes, a control stick (e.g., control stick 212 or 214) may be configured to affect operation of the UAV in different ways. In some instances, in one operating mode, an actuation mechanism may be configured to effect autonomous flight (e.g., flight along a predetermined direction or flight along a previously headed direction) while in another operating mode, an actuation mechanism may be configured to affect the flight of the UAV under autonomous flight.

In some instances, in a first mode, control stick 212 may be configured to affect a forward and backward movement of the UAV while in a second mode, control stick 212 may be configured to affect a velocity of the UAV moving in a forward direction. In a third operating mode, the control stick 212 may be configured to affect a height of the UAV and/or a rotation of the UAV about one or more axes. The user terminal may comprise one, two, three, four, five or more operating modes. In addition, a given control stick (e.g., control stick 212 or 214) may comprise more than one functionality, or may affect a flight (e.g., autonomous flight) of the UAV in more than one parameter. For example, control stick 212 moving forward and backward may affect a change in height of the of a UAV while the control stick 212 moving left and right may affect rotation of a UAV about a roll axis.

Figure 3:
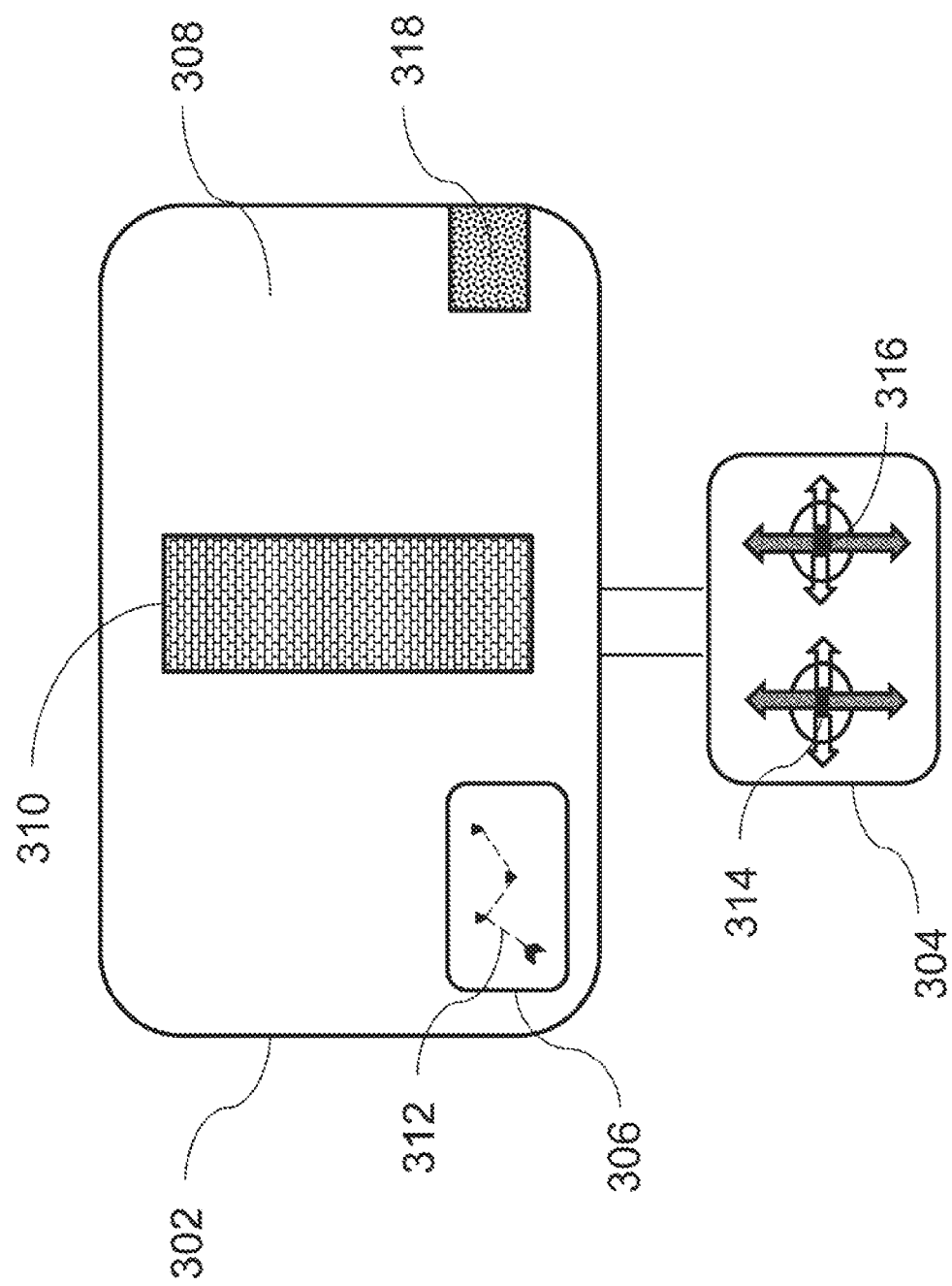
FIG. 3 illustrates a first user interface and a second user interface working in concert, in accordance with embodiments.

In some instances, the second user interface may be utilized to effect real time control of the movable object. In some instances, the first user interface and the second user interface may work together in concert. FIG. 3 illustrates a first user interface 302 and a second user interface 304 working in concert, in accordance with embodiments. The first user interface may be as previously described. For example, the first user interface may comprise a display configured to show one or more images. For example, the display may be configured to show an image of a map 306. The map may be a two dimensional or three dimensional map of an environment around the movable object. Alternatively or in addition, the display may be configured to show a first person view image 308 acquired by a payload coupled to the movable object. For example, the first person view image of FIG. 3 shows an obstacle 310 which the movable object is heading towards.

The second user interface may comprise one or more control sticks 314, 316. The control sticks may be utilized to affect parameters of the movable object, e.g., in real time. In some instances, the control sticks may affect and/or modify autonomous operation (e.g., autonomous flight) of the movable object. For example, a first user input may be received at the first user interface. The first user input may effect autonomous flight of the movable object. For example, a user tapping a target on the map 306 may generate instructions that are sent to a flight controller of the movable object that effects autonomous flight towards the target. The autonomously operating movable object may comprise a flight path 312. While autonomously navigating towards the target, the first user interface may show a first person view image 308 of images captured by a payload coupled to the movable object. Input received at the second user interface may subsequently affect or modify the autonomous operation of the movable object. In some instances, input received at the second user interface may disrupt the autonomous flight of the movable object. Disrupting autonomous flight via the second user interface may provide an effective and easy way to quickly disrupt autonomous flight, e.g., in emergencies or unanticipated situations where interaction with the first user interface (e.g., GUI) is undesired. In some instances, input received at the second user interface may modify autonomous flight of the movable object without disrupting the autonomous operation. For example, the flight path of the movable object may be modified due to the input received at the second user input, but the movable object may continue navigating towards the designated target, e.g., while the second user input is being received and/or after the second user input is received. For example, despite user input on the second user interface, autonomous operation, or flight of the movable object may be maintained such that the movable object continues towards accomplishing its task (e.g., tracking a target, navigating towards a desired location, etc). In exemplary embodiments, the second user input may modify a flight path, or trajectory of the movable object. For example, input at the second user interface may add a directional component to the autonomous flight path of the movable object or may modify the autonomous flight path by adding a velocity or acceleration component to the movable object.

This feature may be advantageous for providing user input in unanticipated situations without disrupting autonomous flight of the movable object. In some instances, the differentiation between the user interfaces (e.g., first and second user interfaces) may prove advantageous as the second user interface may provide an intuitive and easy to use control scheme for modifying the autonomous flight without disrupting an overall autonomous flight of the movable object. For example, this may be desirable in emergency situations or circumstances unaccounted for or undetected by the movable object, where quick user input is necessary, but where continued autonomous flight is desired afterwards. There may be seamless transition between the autonomous flight of the movable object and modification of the autonomous flight by a second user input (e.g., in real time). In addition, there may be seamless transition between the time the movable object takes into account the second user input and the time the movable object returns to autonomous flight (e.g., after the second user input).

For example, the movable object operating under autonomous control may encounter an obstacle 310. The movable object may fail to detect the obstacle (e.g., through error, due to lack of obstacle sensors, etc) and/or fail to implement autonomous obstacle avoidance measures. In such a case, the user may observe that there is an obstacle in a flight path of the autonomously operating movable object. By manipulating the control sticks on the second user interface, the user may be able to easily avoid the obstacle. After avoiding the obstacle, the user may release the control stick and the movable object may continue autonomously operating, or completing its task. For example, by trying to provide input into the first user interface, the movable object may be unable to quickly avoid the obstacle. The second user interface may provide a convenient interface where quick, intuitive controls may be affected by the user. After avoiding the obstacle, the movable object may continue in autonomously operating, or completing its task (e.g., tracking a target, navigating towards a destination). In exemplary embodiments, the second user input may modify a flight path, or trajectory of the movable object. For example, input at the second user interface may add a directional component to the autonomous flight path of the movable object or may modify the autonomous flight path by adding a velocity or acceleration component to the movable object.

For example, the movable object operating under autonomous control transmit a first person view image to the first user interface. In some instances, the user may notice an object of interest 318 in the first person view image. By manipulating the control sticks on the second user interface, the user may be able to head towards (e.g., slightly modify the trajectory of the movable object) the object of interest without disrupting the autonomous operation. After the user is satisfied, the user may release the control stick and the movable object may continue autonomously operating, or completing its task. The movable object may continue autonomously operating without any further input, and there may be a seamless transition between autonomous operation and user directed movement. In exemplary embodiments, the second user input may modify a flight path, or trajectory of the movable object. For example, input at the second user interface may add a directional component to the autonomous flight path of the movable object or may modify the autonomous flight path by adding a velocity or acceleration component to the movable object.

Figure 4:
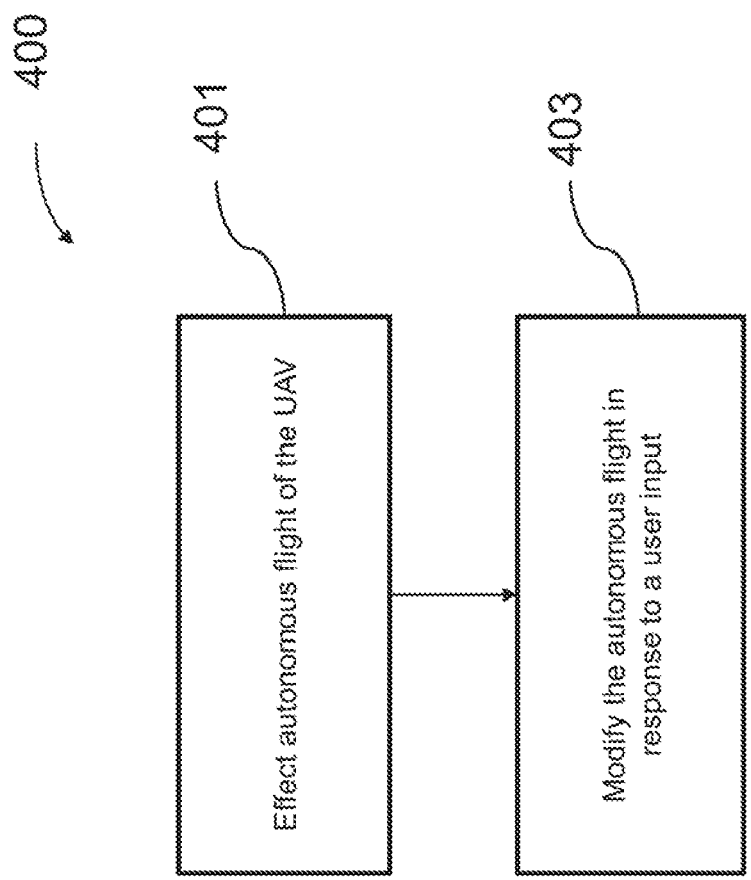
FIG. 4 illustrates a method for modifying autonomous flight of a UAV, in accordance with embodiments.

FIG. 4 illustrates a method for modifying autonomous flight of a UAV, in accordance with embodiments. In step 401, autonomous flight of the UAV may be effected. For example, one or more instructions may be provided in order to effect an autonomous flight of the UAV. In some instances, the one or more instructions may be provided by a user (e.g., at the first user interface, previously described herein). For example, the user may provide an input at a handheld or mobile device such as a cell phone, tablet, or PDA. The handheld or mobile device may comprise a touch screen, and may be configured to display images, as previously described herein. In some instances, the images may comprise images (e.g., first person view images) received from a camera coupled to the UAV and/or images of a map (e.g., 2-D or 3-D map) that shows a location of the UAV. By touching the handheld or mobile device, the user may provide the one or more instructions to effect an autonomous flight of the UAV.

The one or more instructions may be transmitted to a flight controller of the UAV. In response to the one or more instructions transmitted, the flight controller may generate a first set of signals that effects autonomous flight of the UAV, e.g., with aid of one or more processors. For example, the flight controller may generate a first set of signals that instructs one or more propulsion units of the UAV to operate in order to effect the autonomous flight of the UAV.

The autonomous flight may be any flight of the UAV that does not require continued input (e.g., real time input) from the user. In some instances, the autonomous flight may have a predetermined task or goal. Examples of the predetermined task or goal may include, but are not limited to tracking or following a target object, flying to a target area or a desired location, returning to a location of the user or a user terminal. In some instances, the autonomous flight may have a predetermined target that the UAV is moving towards. The target may be a target object or a target destination. For example, the autonomous flight may be autonomous flight towards a predetermined location indicated by the user. In some instances, the autonomous flight may be flight to a predetermined location, an autonomous return of the UAV, an autonomous navigation along one or more waypoints, autonomous flight to a point of interest.

In some instances, the autonomous flight may comprise an autonomous flight trajectory, or an autonomous flight path. In some instances, the autonomous flight may comprise an autonomous flight direction. The trajectory may be a flight trajectory in two, or three dimensional coordinates. In some instances, the autonomous flight may have a preset trajectory. For example, the preset trajectory may be to take the shortest flight path, e.g., in flying towards the target (e.g., target destination or target obstacle) or in accomplishes the task. In some instances, the autonomous flight path may have an autonomously planned trajectory. For example, a flight controller of the UAV may calculate, or autonomously plan a trajectory taking into account various parameters. The parameters may include, but are not limited to environmental conditions, regulations and laws, known obstacles, known events, and objectives. Based on the various parameters, the flight controller may set an autonomously planned trajectory best suited for the autonomous flight. In some instances, the autonomous flight may have a user configured trajectory. For example, prior to effecting the autonomous flight, an operator of the UAV may manually configure a trajectory, or a flight path to be taken by the autonomously operating UAV. In some instances, the trajectory or flight path of the autonomously flying UAV may be displayed on the user terminal, and/or the handheld or mobile device which receives the user input for effecting the autonomous flight of the UAV.

In step 403, the autonomous flight may be modified in response to a user input. For example, during operation of the autonomous flight, a user may provide an input at the user terminal. In some instances, the user input may be provided via buttons or control sticks as previously described herein. The input may provide one or more instructions to modify the autonomous flight of the UAV. The one or more instructions may be transmitted to a flight controller of the UAV which may generate a second set of signals that modify the autonomous flight of the UAV. For example, the flight controller may generate a second set of signals that further instruct one or more propulsion units to operate in order to modify the autonomous flight of the UAV. In some instances, the modification of the autonomous flight may disrupt, or stop, the autonomous flight of the UAV, e.g., until further input. For example, the UAV whose autonomous flight has been disrupted may manually be controlled by the user. In some instances, the UAV whose autonomous flight has been disrupted may hover at the location where the user input has been provided until further instructions are given. Alternatively, the UAV whose autonomous flight has been disrupted may return to the user, or user terminal, or proceed to land.

In some instances, the autonomous flight of the UAV may be modified without disrupting the autonomous flight. For example, the UAV may proceed in carrying out its task (e.g., tracking a target object or moving towards a target destination) while its autonomous flight is modified by the user input. In some instances, the UAV may proceed in flying while its flight is modified by the user input. In some instances, the modification of the autonomous flight may affect a rotation of the UAV about one or more axes of the UAV (e.g., roll axis, yaw axis, pitch axis, etc). In some instances, the modification of the autonomous flight may modify an autonomous flight path of the UAV while maintaining the autonomous flight. As previously described above, the ability to modify a flight path (e.g., affect a trajectory) of the UAV while maintaining autonomous flight may be advantageous as it provides the ability to make minor adjustments in order to deal with unanticipated situations (e.g., not accounted for by a flight controller but noticed by a user) without disrupting autonomous flight. Accordingly, a seamless transition between the autonomous flight of the UAV and user adjustments (e.g., in real time) may be enabled.

In some instances, the method 400 may be effected with aid of one or more processors. For example, a system may be provided for modifying autonomous flight of an unmanned aerial vehicle. The system may comprise one or more processors, individually or collectively configure to: effect an autonomous flight of the UAV, wherein the autonomous flight comprises an autonomous flight path; and modify the autonomous flight path in response to a user input, wherein the autonomous flight path is modified while maintaining the autonomous flight.

In some instances, the method 400 may be effected with aid of a non-transitory computer readable medium comprising code, logic, or instructions. For example, the non-transitory computer readable medium may comprise code, logic, or instructions to effect an autonomous flight of the UAV, wherein the autonomous flight comprises an autonomous flight path; and modify the autonomous flight path in response to a user input, wherein the autonomous flight path is modified while maintaining the autonomous flight.

In some instances, an unmanned aerial vehicle may be used to effect method 400. For example, the UAV may comprise a flight controller configured to generate (1) a first set of signals for autonomous flight of the UAV, wherein the autonomous flight comprises an autonomous flight path, and (2) a second set of signals for modification of the autonomous flight path, wherein the autonomous flight path is modified while maintaining the autonomous flight; and one or more propulsion units configured to (a) effect the autonomous flight of the UAV in response to the first set of signals, and (b) modify the autonomous flight path of the UAV in response to the second set of signals.

Figure 5:
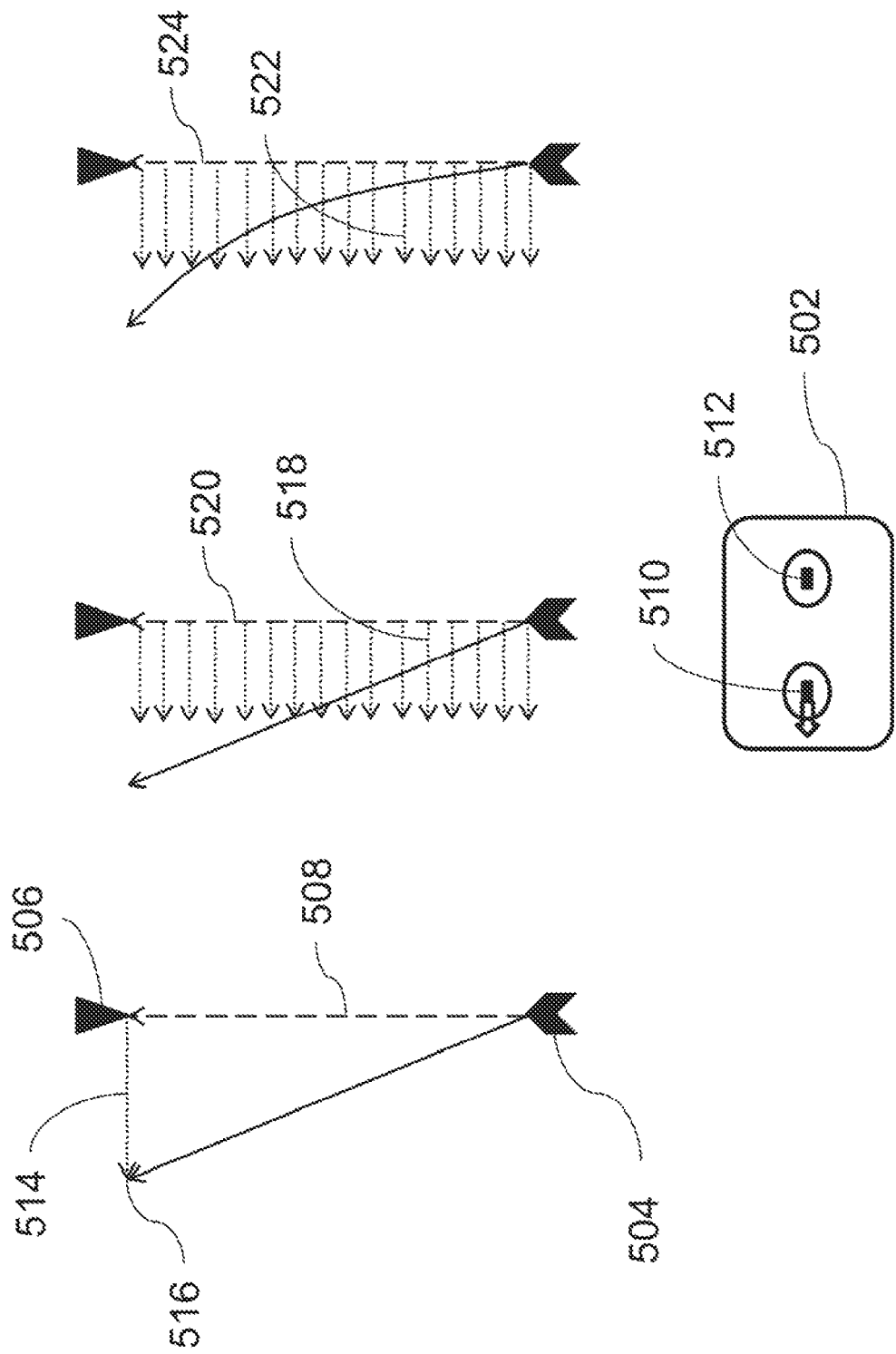
FIG. 5 illustrates an autonomous flight path of the UAV being modified by a user input, in accordance with embodiments.

FIG. 5 illustrates an autonomous flight of the UAV being modified by a user input, in accordance with embodiments. In some instances, a UAV may be operating autonomously. For example, the UAV 504 may be autonomously flying towards a target 506, e.g., in accordance with instructions from a user. The autonomous flight may comprise an autonomous flight path 508. In some instances, a user may provide an input (e.g., at the user terminal) in order to modify the autonomous flight of the UAV. In some instances, the autonomous flight path of the UAV may be modified by the user input. For example, the user may provide an input at a remote controller 502 that comprises one or more control sticks 510, 512. The control sticks may be configured to affect rotation of the UAV about one or more axes. For example, the one or more control sticks may comprise a roll stick configured to affect rotation of the UAV about a roll axis and/or a yaw stick configured to affect a rotation of the UAV about a yaw axis. In some instances, the one or more control sticks may comprise a pitch stick. The pitch stick may be configured to affect change in a velocity of the UAV. In some instances, the one or more control sticks may comprise a throttle stick. The throttle stick may be configured to affect a change in a height (e.g., altitude) of the UAV.

By providing an input, the user may actuate at least one of the one or more control sticks. The user input received at the user terminal may provide one or more instructions to modify the autonomous flight of the UAV. The one or more instructions may be transmitted to a flight controller of the UAV which may generate a set of signals that modify the autonomous flight of the UAV, e.g., by affecting a rotation of the UAV about one or more axes, by affecting a change in velocity of the UAV, or by affecting a change in a height of the UAV. For example, the flight controller may generate a set of signals that further instruct one or more propulsion units to operate in order to modify the autonomous flight of the UAV, e.g., by affecting a rotation of the UAV about one or more axes. In some instances, actuation of the roll stick may affect rotation of the UAV about a roll axis while actuation of the yaw stick may affect rotation of the UAV about the yaw axis, e.g., while maintaining autonomous flight of the UAV. In some instances, actuation of the throttle stick may affect a height of the UAV while actuation of the pitch stick may affect a velocity of the UAV.

In some instances, the user input (e.g., actuation of the control stick) may add a direction component to the autonomous flight path 508 of the UAV. For example, the user input may modify the desired target 506 by a certain distance 514 such that the UAV is moving towards a new target 516. In some instances, the UAV may move towards the new target without rotating about the yaw axis. For example, the UAV may move towards the new target in connection with rotating the UAV about the roll axis. The added directional component may or may not be perpendicular to the autonomous flight path 508 of the UAV. In some instances, the added direction component may be along a reference plane. A reference plane as used herein may be any reference plane. The reference plane may be a relative reference plane that may depend on other factors. For example, the reference plane may adjust depending on a state of the UAV such as a position and/or orientation of the UAV. For example, the reference plane may be a transverse plane of the UAV which may adjust with an orientation of the UAV. In some instances, the reference plane may be a transverse plane of the UAV in a hovering position. In some instances, the reference plane may be a transverse plane of the UAV in an upright position. In some instances, the reference plane may be relative to external factors or the environment. The reference plane may be relative to a may be a specified or predetermined reference plane such as a transverse plane of the UAV or a horizontal plane. In some instances, the added directional component may be both perpendicular to the autonomous flight path of the UAV and along a reference plane. The added directional component may be a horizontal component that modifies the autonomous flight path of the UAV in a horizontal direction. In some instances, the added directional component may correspond to a degree of the user input, e.g., a duration of the user input or a force of the user input (e.g., degree of actuation of the one or more joysticks). For example, if the user input is maintained, the added directional component may gradually increase. For example, a greater directional component may be added for a joystick that is actuated more than a joystick that is less actuated. The correspondence may or may not be linear. In some instances, the added component may modify the flight path of the UAV in accordance with any mathematical function, e.g., linear, exponential, etc.

In some instances, the user input may add a velocity component 518 to the UAV in modifying the autonomous flight path 520 of the UAV. The added velocity component may or may not be perpendicular to the autonomous flight path of the UAV. In some instances, the added velocity component may be along a reference plane. For example, the added velocity component may be along a transverse plane of the UAV and/or along a horizontal plane. In some instances, the added velocity component may be both perpendicular to the autonomous flight path of the UAV and along a reference plane. The added velocity component may be a horizontal component that modifies the autonomous flight path of the UAV in a horizontal direction. In some instances, the velocity component may be added in connection with rotating the UAV about the roll axis. In some instances, the velocity component may be added without affecting rotation of the UAV about the yaw axis. In some instances, the added velocity component may be continued to be applied while the user input is maintained, as shown by the plurality of velocity components applied over time in FIG. 5. In some instances, the added velocity component may correspond to a degree of the user input, e.g., a duration of the user input or a force of the user input (e.g., degree of actuation of the one or more joysticks). For example, if the user input is maintained, the added velocity component may gradually increase. For example, a greater velocity component may be added for a joystick that is actuated more than a joystick that is less actuated. The correspondence may or may not be linear. In some instances, the added component may modify the flight path of the UAV in accordance with any mathematical function, e.g., linear, exponential, etc.

In some instances, the user input may add an acceleration component 522 to the UAV in modifying the autonomous flight path 524 of the UAV. The added acceleration component may or may not be perpendicular to the autonomous flight path of the UAV. In some instances, the added acceleration component may be along a reference plane. For example, the added acceleration component may be along a transverse plane of the UAV and/or along a horizontal plane. In some instances, the added acceleration component may be both perpendicular to the autonomous flight path of the UAV and along a reference plane. The added acceleration component may be a horizontal component that modifies the autonomous flight path of the UAV in a horizontal direction. In some instances, the acceleration component may be added in connection with rotating the UAV about the roll axis. In some instances, the acceleration component may be added without affecting rotation of the UAV about the yaw axis. In some instances, the added acceleration component may be continued to be applied while the user input is maintained. In some instances, the added acceleration component may correspond to a degree of the user input, e.g., a duration of the user input or a force of the user input (e.g., degree of actuation of the one or more joysticks). For example, if the user input is maintained, the added acceleration component may gradually increase. For example, a greater acceleration component may be added for a joystick that is actuated more than a joystick that is less actuated. The correspondence may or may not be linear. In some instances, the added acceleration component may modify the flight path of the UAV in accordance with any mathematical function, e.g., linear, exponential, etc.

In some instances, actuation of a roll stick may add a direction component, velocity component, and/or acceleration component as previously described herein. For example, control stick 510 may be an example of a roll stick. Alternatively, control stick 512 may be an example of a roll stick. Actuation of the roll stick may add a horizontal velocity component to the UAV. In some instances, the added velocity component may be due to rotation of the UAV about a roll axis. In some instances, the added velocity component may correspond to a degree of actuation of the roll stick. For example, the roll stick may comprise a resting state where no force is exerted on the roll stick, and two fully actuated states in opposite directions. For example, the roll stick may be configured to move to the left and to the right. In some instances, the position of the roll stick may be described as being between −1 (fully actuated to the left) and 1 (fully actuated to the right). For example, a roll stick that is halfway moved towards the left may comprise a position of −0.5 while a roll stick that is a third of the way moved towards the right may comprise a position of 0.333. In some instances, a velocity component (e.g., horizontal velocity component) that is added to the UAV as a result of the actuation of the roll stick may be described by the equation: (1) added velocity component=(roll stick position)×velocity factor. In some instances, the velocity factor may be a predetermined velocity value, e.g., factory set or user determined value. For example, the predetermined velocity value may be equal to or less than about 2 m/s, 4 m/s, 6 m/s, 8 m/s, 10 m/s, 12 m/s, 15 m/s, 20 m/s, or 50 m/s. In some instances, the velocity factor may depend on a forward velocity of the UAV. For example, the forward velocity may refer to a velocity component of the UAV along the autonomous flight path. In FIG. 5, the forward velocity component may refer to a velocity component of the UAV along a direction parallel to autonomous flight path 508. In some instances, the forward velocity component may refer to a velocity component of the UAV along the roll axis of the UAV. In such cases, the velocity component that is added to the UAV as a result of the actuation of the roll stick may be described by the equation: (2) added velocity component=(roll stick position)×(forward velocity component)×factor. In some instances, the factor may be equal to or less than about 0.1, 0.2, 0.4, 0.6, 0.8, 1, 2, or 4. In some instances, the factor may be equal to about 0.5.

Figure 13:
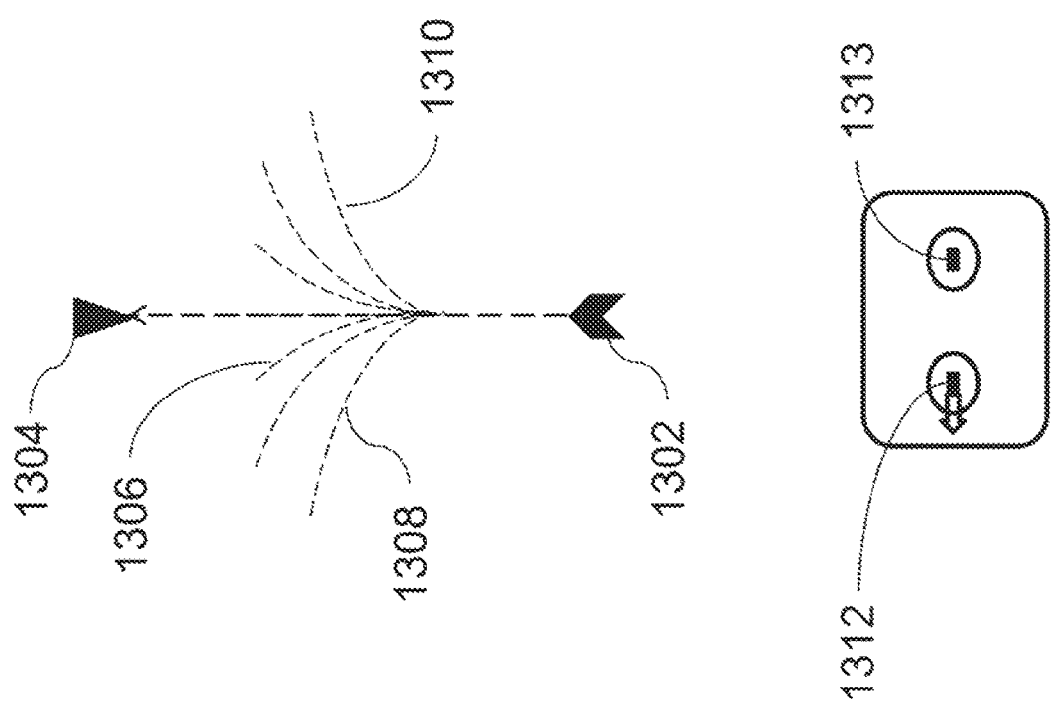
FIG. 13 illustrates a UAV flying in a curved trajectory in response to actuation of one or more control sticks, in accordance with embodiments.

In some instances, the user input may modify a flight path of the UAV to make it such that the UAV flies in a curved trajectory toward a direction of the one or more control sticks. FIG. 13 illustrates a UAV flying in a curved trajectory in response to actuation of one or more control sticks, in accordance with embodiments. In some instances, the user input may affect rotation of the UAV about a yaw axis of the UAV such that it flies in a curved trajectory. For example, control stick 1312 may be an example of a yaw stick. Alternatively, control stick 1313 may be an example of a yaw stick. In some instances, a speed of the UAV flying along a preset curved trajectory (e.g., trajectory 1306, 1308, 1310, etc) may depend on or be proportional to a user's input on the yaw stick. Alternatively, the radius of the curve, or degree of rotation of the UAV about the yaw axis may inversely depend on, or be inversely proportional to a user's input on the yaw stick. In some instances, the position of the yaw stick may be described as being between −1 (fully actuated to the left) and 1 (fully actuated to the right), substantially as described with respect to the roll stick. If the user fully actuates the yaw stick to the left, the UAV may fly along trajectory 1308 with a small radius of curvature while if the user actuates the yaw stick to the left by a small amount, the UAV may fly along trajectory 1306 with a large radius of curvature. Similarly, if the user fully actuates the yaw stick to the right, the UAV may fly along a trajectory 1310 with a small radius of curvature.

As provided in FIGS. 5 and 13, the flight path of the autonomously operating UAV may be modified intuitively. For example, actuation of the one or more control sticks 510, 512 to the left may modify the flight path of the UAV such that it moves towards the left, e.g., while maintaining the autonomous flight of the UAV such that it keeps moving towards the target. For example, actuation of the one or more control sticks (e.g., via input from the user) to the right may modify the flight path of the UAV such that it moves towards the right.

Figure 6:
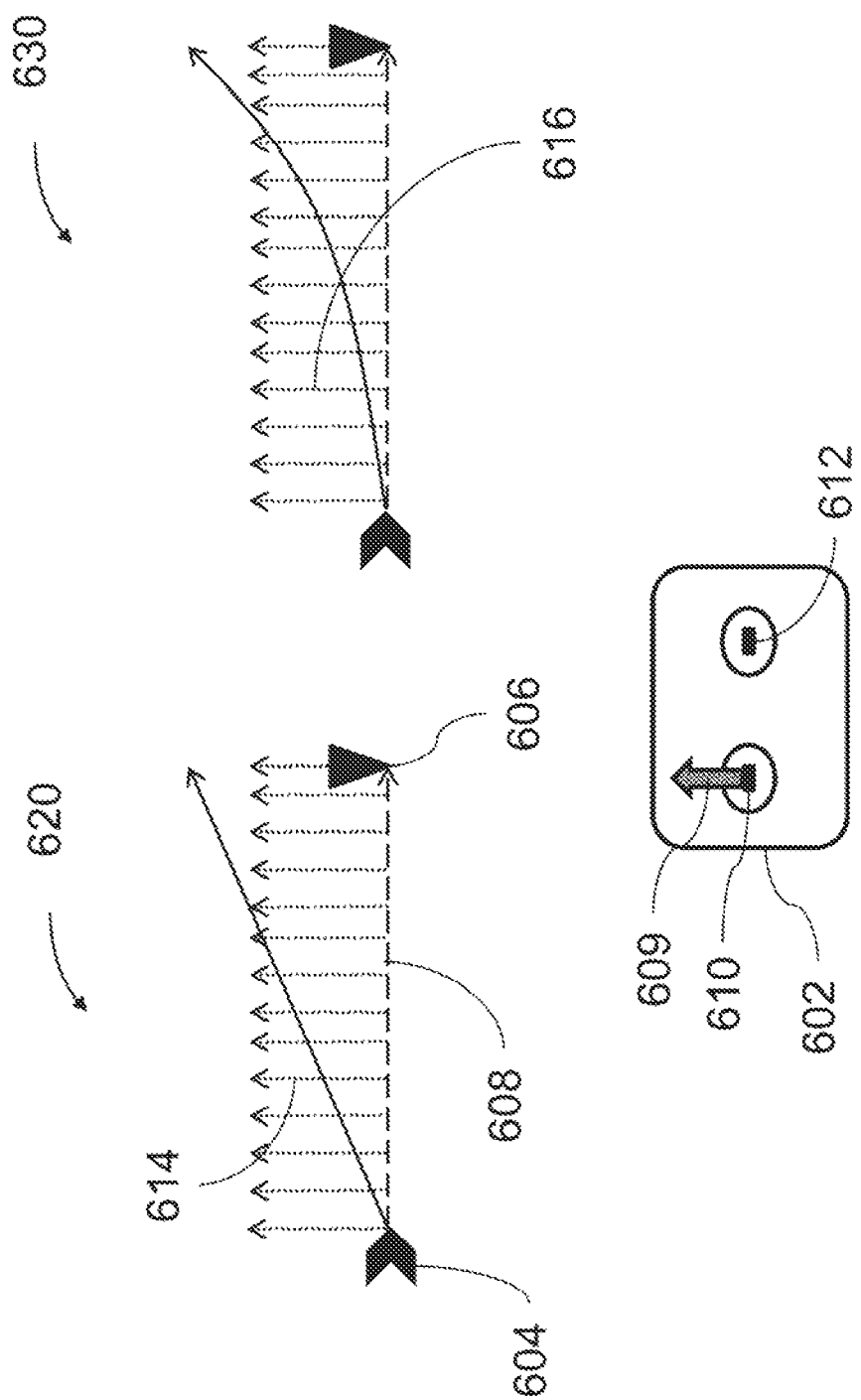
FIG. 6 illustrates a side view of an autonomous flight path of the movable object modified by a user input, in accordance with embodiments.

In some instances, the added components (e.g., direction, velocity, acceleration, etc) referred to above may include vertical components. FIG. 6 illustrates a side view of an autonomous flight path of the movable object modified by a user input, in accordance with embodiments. In some instances, a UAV 604 may be autonomously flying towards a target 606, e.g., in accordance with instructions from a user. The autonomous flight may comprise an autonomous flight path 608. In some instances, a user may provide an input (e.g., at the user terminal) in order to modify the autonomous flight of the UAV. For example, the user may provide an input at a remote controller 602 that comprises one or more control sticks 610, 612. In some instances, the control sticks may be configured to affect a height of the UAV without affecting rotation of the UAV about one or more axes of the UAV. Alternatively, the control sticks may be configured to affect height of the UAV via rotation of the UAV about one or more axes.

Substantially as described above, a direction component may be added to the autonomous flight path of the UAV. In some instances, a velocity component 614 (e.g., vertical velocity component) may be added to the UAV in modifying the autonomous flight path of the UAV as shown in embodiment 620. In some instances, an acceleration component 616 (e.g., vertical acceleration component) may be added to the UAV in modifying the autonomous flight path of the UAV as shown in embodiment 630. In some instances, actuation of the one or more control sticks to the top (e.g., away from the user) may modify the flight path of the UAV such that it moves vertically up as shown in embodiments 620 and 630. Alternatively, actuation of the one or more control sticks to the bottom may modify the flight path of the UAV such that it moves vertically up. In some instances, actuation of the one or more control sticks to the bottom (e.g., towards the user) may modify the flight path of the UAV such that it moves vertically down. Alternatively, actuation of the one or more control sticks to the top may modify the flight path of the UAV such that it moves vertically down.

In some instances, the control stick configured to affect a height of the UAV may be a throttle stick. For example, control stick 610 may be a throttle stick. Alternatively, control stick 612 may be an example of a throttle stick. Actuation of the throttle stick may add a vertical velocity component to the UAV. In some instances, the added velocity component may correspond to a degree of actuation of the throttle stick. For example, the throttle stick may comprise a resting state where no force is exerted on the throttle stick, and two fully actuated states in opposite directions. For example, the throttle stick may be configured to be capable of moving both (1) towards the top as indicated by direction 609, and (2) towards the bottom. In some instances, the position of the throttle stick may be described as being between −1 (fully actuated to the bottom) and 1 (fully actuated to the top). For example, a throttle stick that is halfway moved towards the bottom may comprise a position of −0.5 while a roll stick that is a third of the way moved towards the top may comprise a position of 0.333. In some instances, a velocity component (e.g., vertical velocity component) that is added to the UAV as a result of the actuation of the throttle stick may be described by the equation: (1) added velocity component=(throttle stick position)×velocity factor. A negative velocity may indicate that the UAV is moving down while a positive velocity component may indicate that the UAV is moving up. In some instances, the velocity factor may be a predetermined velocity value, e.g., factory set or user determined value. For example, the predetermined velocity value may be equal to or less than about 2 m/s, 4 m/s, 6 m/s, 8 m/s, 10 m/s, 12 m/s, 15 m/s, 20 m/s, or 50 m/s. In some instances, the predetermined velocity value may be equal to about 3 m/s. In some instances, the velocity factor may depend on a forward velocity of the UAV. For example, the forward velocity may refer to a velocity component of the UAV along the autonomous flight path. In FIG. 6, the forward velocity component may refer to a velocity component of the UAV along a direction parallel to autonomous flight path 608. In some instances, the forward velocity component may refer to a velocity component of the UAV along the roll axis of the UAV. In such cases, the velocity component that is added to the UAV as a result of the actuation of the throttle stick may be described by the equation: (2) added velocity component=(roll stick position)×(forward velocity component)×factor. A negative velocity may indicate that the UAV is moving down while a positive velocity component may indicate that the UAV is moving up. In some instances, the factor may be equal to or less than about 0.1, 0.2, 0.4, 0.6, 0.8, 1, 2, or 4. In some instances, the factor may be equal to about 0.5.

Figure 14:
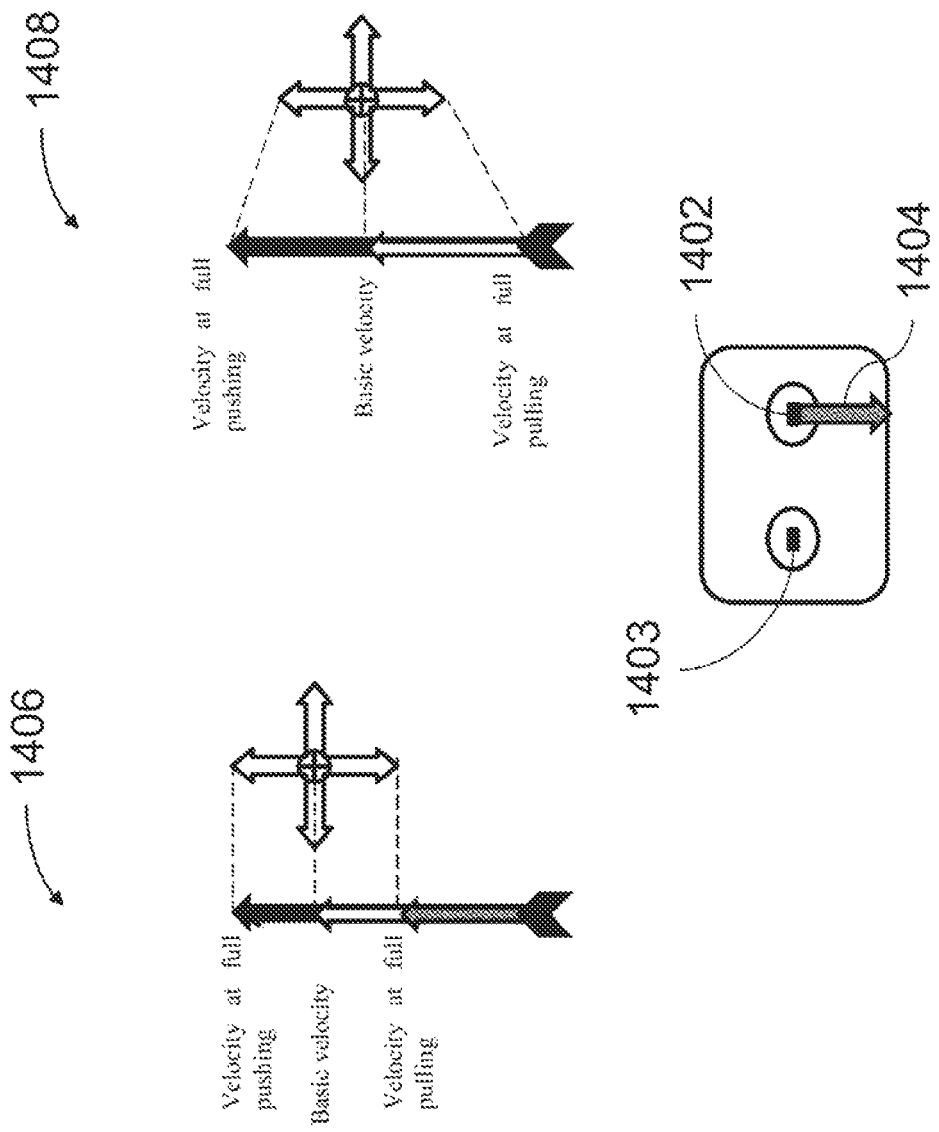
FIG. 14 illustrates a top-down view of an unmanned aerial vehicle moving with increased or decreased velocity along an autonomous flight path, in accordance with embodiments.

In some instances, components (e.g., velocity component, acceleration component, etc) may be added without affecting a flight path of the UAV. FIG. 14 illustrates a top-down view of an unmanned aerial vehicle moving with increased or decreased velocity along an autonomous flight path, in accordance with embodiments. In some instances, a user input may modify a velocity or acceleration of an autonomously flying UAV without affecting its trajectory or flight path. In some instances, the user input to affect velocity of the UAV may be received via one or more control sticks.

In some instances, the control stick configured to affect a velocity of the UAV without affecting a flight path of the UAV may be a pitch stick. For example, control stick 1402 may be an example of a pitch stick. Alternatively, control stick 1403 may be an example of a pitch stick. Actuation of the pitch stick may affect or modify a velocity of the UAV, e.g., along a roll axis of the UAV. In some instances, the velocity of the UAV may be increased or decreased according to a degree of actuation of the pitch stick. For example, the pitch stick may comprise a resting state where no force is exerted on the pitch stick, and two fully actuated states in opposite directions. For example, the pitch stick may be configured to move towards the bottom as indicated by direction 1404 and towards the top. In some instances, the position of the pitch stick may be described as being between −1 (fully actuated to the bottom) and 1 (fully actuated to the top). For example, a pitch stick that is halfway moved towards the bottom may comprise a position of −0.5 while a roll stick that is a third of the way moved towards the top may comprise a position of 0.333. In some instances, a velocity component of the UAV (e.g., along the autonomous flight path or along its roll direction) resulting from actuation of the pitch stick may be described by the equation: (1) velocity component=(pitch stick position)×velocity factor+(basic flight velocity) as illustrated in embodiment 1406. In some instances, the velocity factor may be a predetermined velocity value, e.g., factory set or user determined value. For example, the predetermined velocity value may be equal to or less than about 2 m/s, 4 m/s, 6 m/s, 8 m/s, 10 m/s, 12 m/s, 15 m/s, 20 m/s, or 50 m/s. In some instances, the basic flight velocity may be a predetermined basic flight velocity, e.g., factory set or user determined value. For example, predetermined basic flight velocity the predetermined velocity value may be equal to or less than about 2 m/s, 4 m/s, 6 m/s, 8 m/s, 10 m/s, 12 m/s, 15 m/s, 20 m/s, or 50 m/s. In some instances, a velocity component of the UAV (e.g., along the autonomous flight path or along its roll direction) resulting from actuation of the pitch stick may be described by the equation: (2) velocity component=(pitch stick position+1)×(basic flight velocity)×factor as illustrated in embodiment 1408. In some instances, the factor may be equal to or less than about 0.1, 0.2, 0.4, 0.6, 0.8, 1, 2, or 4. In some instances, the factor may be equal to about 1.

In some instances, different control sticks may modify the flight path of the movable object in different ways. For example, actuation of the roll stick may affect a rotation of the UAV about a roll axis which may add a horizontal velocity component to the UAV to modify the autonomous flight path of the UAV while actuation of the yaw stick may affect rotation of the UAV about a yaw axis which may add an acceleration (e.g., centripetal acceleration) component to the UAV to modify the autonomous flight path of the UAV. For example, actuation of the throttle stick may add a vertical velocity component to the UAV to modify the autonomous flight path of the UAV while actuation of the pitch stick may affect a velocity of the UAV about its roll axis.

Figure 7:
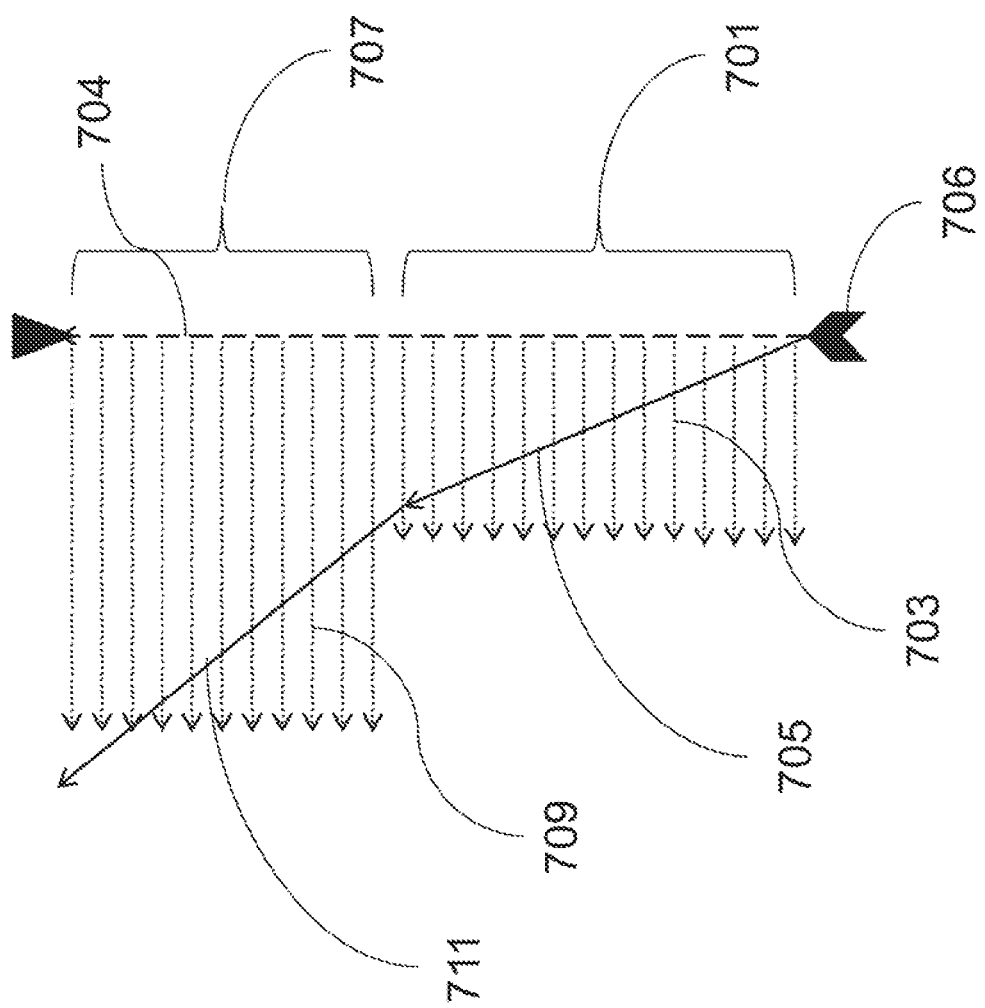
FIG. 7 illustrates a force of the user input proportionally modifying the autonomous flight of the movable object, in accordance with embodiments.

In some instances, a degree of the user input may correspond with how much the autonomous flight of the UAV is modified. The degree of user input may correspond to a duration of the user input. For example, in response to continued input from a user (e.g., continued actuation of the one or more control sticks), the rotation of the UAV about one or more of its axes may increase. For example, depending on an amount of time the one or more control sticks is actuated, a directional, velocity, and/or acceleration component that is added may continue to increase. In some instances, the degree of user input may correspond to a force of the user input. FIG. 7 illustrates a force of the user input proportionally modifying the autonomous flight of the movable object, in accordance with embodiments. In some instances, the degree of user input may correspond to an amount of force exerted by the user in providing the user input. In some instances, the degree of user input may correspond to how much an input device (e.g., the one or more control sticks) is actuated. During a first time period 701, the degree of the user input may be at a first level 703. Accordingly, the autonomous flight path 704 of the UAV 706 may be modified by a first degree as shown by the modified flight path 705. During a second time period 707, the degree of user input may be at a second level 709. For example, the user may exert more force on a control stick or may actuate the control stick further. Accordingly, the autonomous flight path of the UAV may be modified by a second degree as shown by the second modified flight path 711. In some instances, the correspondence may be linear. For example, if the user exerts twice the amount of force, or actuates the control stick twice as far, velocity components that are added to the UAV may be twice as compared to before, and the flight path of the UAV may be modified by twice the amount. Alternatively, the correspondence may not be linear. In some instances, the relationship between the actuation of the one or more control sticks and behavior of the UAV may be as previously described herein, e.g., with respect to the roll stick, pitch stick, and yaw stick.

In some instances, the autonomous flight of the UAV may be modified taking into account various other factors (e.g., in addition to the user input). In some instances, the various other factors may include environmental factors. The environmental factors may be determined based on one or more sensors on board the UAV. For example, the autonomous flight path of the UAV may be modified taking into account data from proximity or obstacle sensors in order to ensure that the desired modification according to the user input will not endanger the UAV or others (e.g., by putting the UAV at risk of colliding with a detected obstacle). For example, the autonomous flight path of the UAV may be modified taking into account data from other sensors in order to ensure that the desired modification according to the user input will not destabilize a balance of the UAV such that UAV becomes unstable or uncontrollable. Accordingly, the user input may be processed and interpreted by a flight controller on board the UAV before signals are generated and instructions are sent to the one or more propulsion mechanism to modify the autonomous flight path, e.g., to ensure stability and safety.

Figure 8:
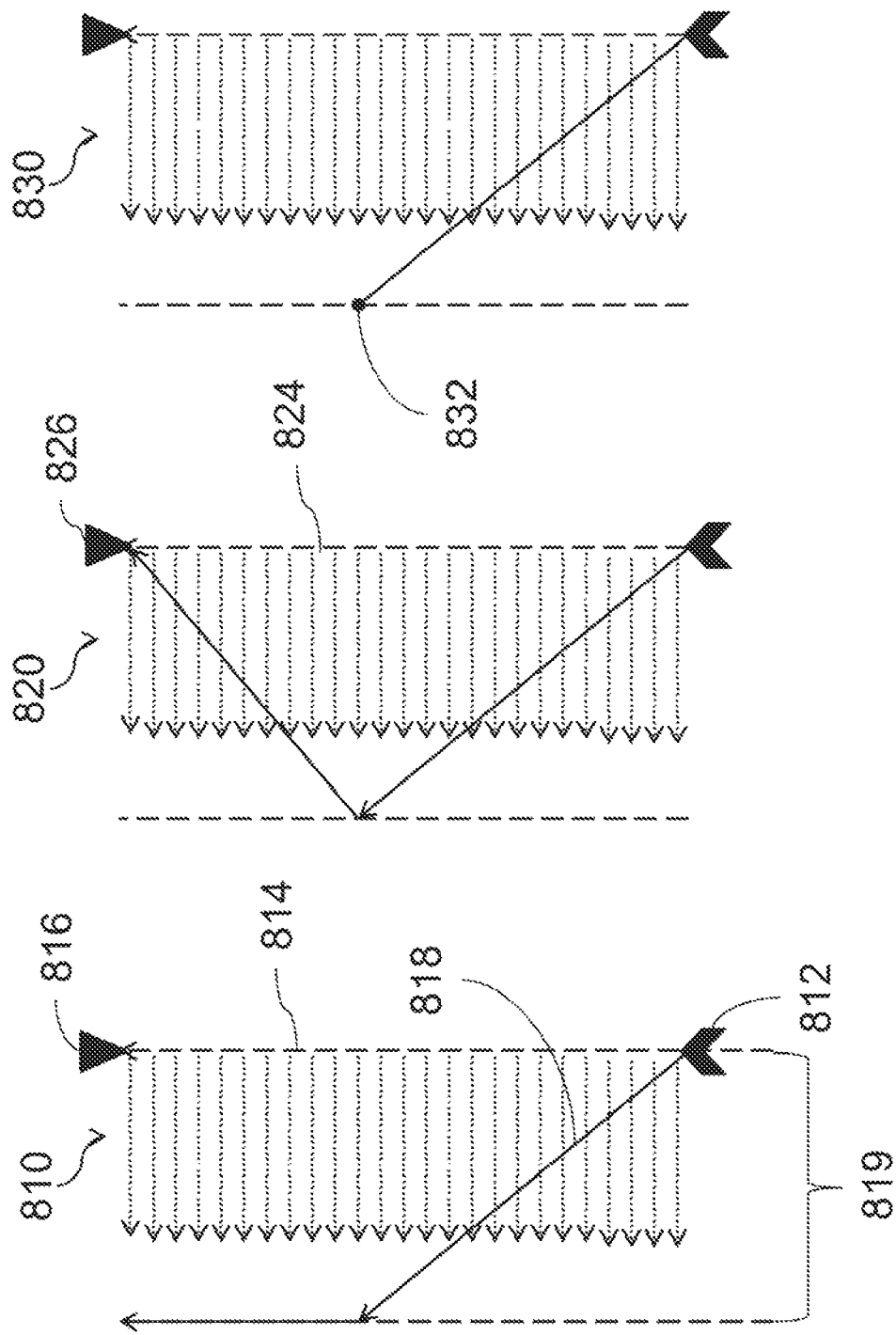
FIG. 8 illustrates behavior of the UAV upon reaching a threshold, in accordance with embodiments.

In some instances, the various factors referred to above may include a threshold. The threshold may be a threshold time and/or a threshold distance. The threshold time and/or threshold distance may be predetermined. In some instances, the threshold time and/or threshold distance may be configured prior to and/or during operation of the UAV by a user. FIG. 8 illustrates behaviors of the UAV upon reaching a threshold, in accordance with embodiments. In some instances, the threshold may be a threshold distance. For example, if the UAV's flight path deviates from the original autonomous flight path by more than a threshold distance as a result of a user input, further modification of the autonomous flight path may be prevented, despite the user input. In some instances, the threshold may be a threshold time. For example, if the UAV's flight path deviates from the original autonomous flight path for more than a threshold time as a result of a user input, further deviation may be prevented, despite the user input.

For example, autonomous flight of a UAV 812 may be effected. The autonomous flight may comprise an autonomous flight path 814 towards a target 816. While the UAV is autonomously flying towards the target, a user (e.g., operator of the UAV) may modify the autonomous flight, e.g., by actuating one or more control sticks. The UAV may follow a modified flight path 818 as a result of the user input. In some instances, once the UAV is at a threshold distance 819 away from the original autonomous flight path, the user input may no longer instruct the UAV to deviate from the autonomous flight path 814. For example, even with continued user input, the UAV may only be able maintain the threshold distance 819 from the autonomous flight path 814 as shown in embodiment 810. For example, once the UAV reaches the threshold distance as a result of the user input, the UAV may begin moving towards the target 826 as shown in embodiment 820. In some instances, once the UAV reaches the threshold distance as a result of the user input, the UAV may begin moving towards the original autonomous flight path 824 before moving towards the target. In some instances, once the UAV reaches the threshold distance as a result of the user input, the autonomous flight of the UAV may be disrupted as shown in embodiment 830. The UAV may hover at the location 832 afterwards, or land at or near the location where the distance threshold was reached. In some instances, the user may be required to manually control the UAV after reaching the threshold distance away from the autonomous flight path.

In some instances, an alert may be sent to the user upon reaching the threshold distance. The alert may be a visual, auditory, and/or tactile alert. In some instances, the alert may be sent to the user terminal. The alert may inform the user that the user is at the threshold distance. In some instances, the alert may inform the user that continued user input and/or deviation from the original autonomous flight path will result in termination of the autonomous flight. In some instances, the alert may be sent upon reaching the threshold distance but the autonomous flight of the UAV may continue to be modified by the user input. In some instances, the alert may be sent upon reaching the threshold distance and further modification of the flight path may be prevented as previously described in embodiments 810, 820, or 830. In some instances, the behavior of the UAV may depend on more than one threshold. For example, the behavior of the UAV after release of the user input may depend on both a threshold time and a threshold distance. For example, the behavior of the UAV during the user input may be affected by a first threshold distance (or time) and a second threshold distance (or time). In some instances, the UAV may send an alert to the user in deviating from the autonomous flight path by a first threshold distance and may be prevented from further deviation upon reaching a second threshold distance greater than the first threshold distance.

While threshold distances have primarily been discussed herein, it shall be understood that the discussions above may be equally applicable for threshold times. For example, if the UAV deviates from the autonomous flight path for a duration longer than the threshold time, the UAV may be forced to return to the original autonomous flight path before being allowed to deviate once again. In some instances, if the UAV's flight path deviates from the autonomous flight path for a duration longer than the threshold time, an alert may be sent to the user as described above.

Figure 9:
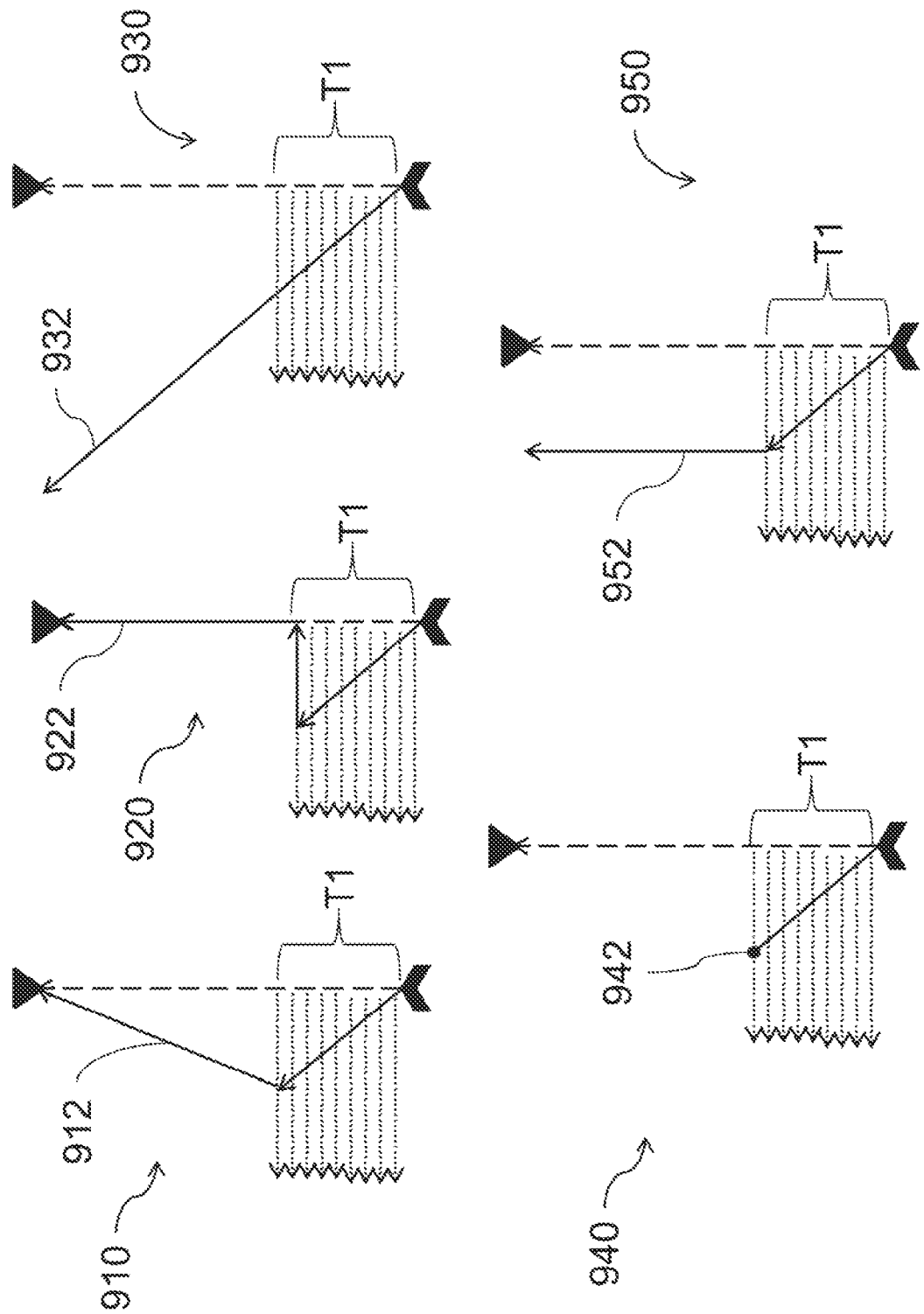
FIG. 9 illustrates behavior of the UAV after user input modifying the autonomous flight of the movable object is released, in accordance with embodiments.

The modification of the autonomous flight path may be maintained only for a time period during which the user input is maintained. Alternatively, the modification of the autonomous flight path may be maintained after the user input. FIG. 9 illustrates behavior of the UAV after user input modifying the autonomous flight of the movable object is released, in accordance with embodiments. For each of the configurations 910, 920, 930, 940, and 950, user input modifying the autonomous flight path may be received for a time period T1. The user input may be released after the time period. After the release, the movable object may autonomously operate to fly towards the target (e.g., target object and/or target destination) as shown by embodiments 910 and 920. In some instances, the UAV may calculate (e.g., autonomously calculate) the shortest flight path between the UAV and the target and generate a new autonomous flight path 912 to take in moving towards the target. In some instances, the UAV may return to the original autonomous flight path 922 and continue its autonomous flight towards the target. Alternatively, after the release, the UAV may continue its flight on the modified flight path 932. For example, after actuation of yaw stick and subsequent release, the UAV may fly along its new roll direction. In some instances, after the release, the UAV may remain at the location 942 where the user input is released until further input. For example, the UAV may hover at the location or may land at, or near, the location where the user input is released. In some instances, after release, the UAV may take a new autonomous flight path 952. The new autonomous flight path may be parallel to the original autonomous flight path. Alternatively, the new autonomous flight path may be at any arbitrary angle with respect to the original autonomous flight path.

In some instances, the behavior of the UAV after release of the user input (e.g., that modifies the autonomous flight path) may depend on a threshold. The threshold may be a threshold time and/or a threshold distance. For example, if the user input is provided for a duration more than a threshold time, after release of the user input, the UAV may continue on the modified autonomous flight path as shown in configuration 930. However, if the user input is provided for a duration less than the threshold time, the UAV may autonomously operate towards the target as shown in configurations 910 or 920. In some instances, if the user input is provided for a duration less than the threshold time, the UAV may remain at the location where the user input is released until further instructions are given as shown in configuration 940. The threshold distance and/or threshold time may be predetermined. In some instances, the threshold distance and/or threshold time may be user configured prior to and/or during operation of the UAV.

While threshold times have primarily been discussed, it shall be understood that the discussions above may be equally applicable for threshold distances. For example, if the user input is provided such that the UAV deviates from the original autonomous flight path by more than a distance threshold, the UAV may continue on the modified autonomous flight path as shown in configuration 930 after release of the user input. However, if the user input is provided such that the UAV deviates from the original autonomous flight path less than a distance threshold, the UAV may autonomously operate towards the target as shown in configurations 910 or 920 or may remain at the location where the user input is released as shown in configuration 940.

Any combination of the various configurations provided herein may be possible. For example, if the user input is provided for a duration less than a threshold time, the UAV may continue on the modified autonomous flight path as shown in configuration 930 while if the user input is maintained for a duration more than the threshold time, the UAV may autonomously operate towards the original target as shown in configurations 910 or 920. In addition, the behavior of the UAV may depend on more than one threshold. For example, the behavior of the UAV after release of the user input may depend on both a threshold time and a threshold distance. For example, the behavior of the UAV after release of the user input may depend on whether the user input is maintained for a duration more than a first threshold time (or distance) or a second threshold time (or distance).

Figure 10:
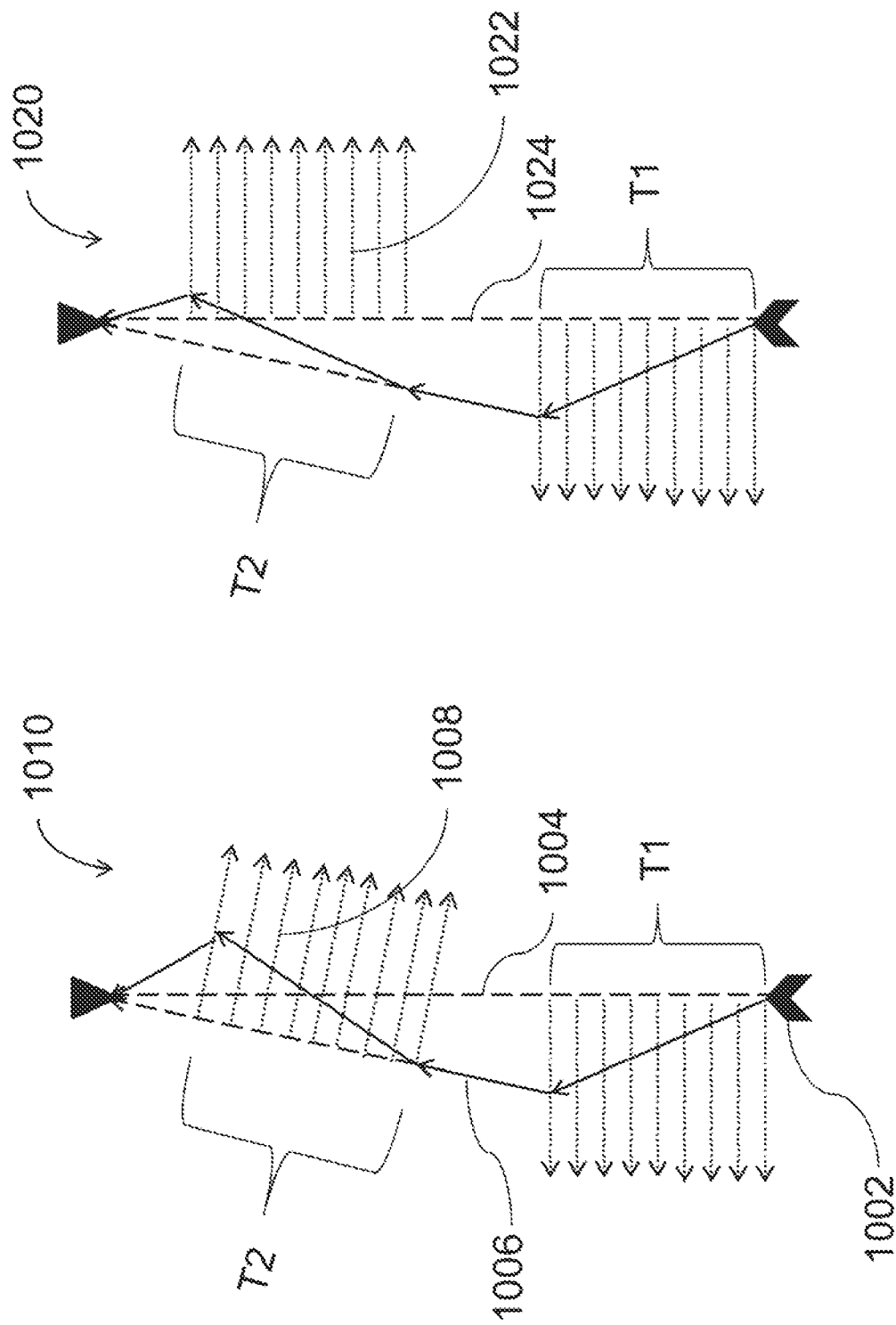
FIG. 10 illustrates a new autonomous flight path of a UAV modified by a user input, in accordance with embodiments.

Once the UAV begins following a new autonomous flight path, subsequent user input during autonomous flight may modify the new autonomous flight path. Alternatively, subsequent user input during autonomous flight may modify the UAV with respect to the original autonomous flight path. FIG. 10 illustrates a new autonomous flight path of a UAV modified by a user input, in accordance with embodiments. Substantially as described herein, autonomous flight of UAV 1002 may be effected. The autonomous flight of the UAV may comprise an original autonomous flight path 1004. During a time period T1, a user input may modify the autonomous flight path of the UAV. After release of the user input, the UAV may continue its autonomous flight. In some instances, the UAV may continue its autonomous flight with a new autonomous flight path 1006. During a time period T2, a new user input may modify the new autonomous flight path of the UAV. In some instances, the modification 1008 may be with respect to the new autonomous flight path, as shown in embodiment 1010. For example, a direction component may be added to the new autonomous flight path. The direction component may be perpendicular to the new autonomous flight path. In some instances, the direction component may be added along a reference plane such as a transverse plane of the UAV or along a horizontal plane. Alternatively or in addition, a velocity component may be added to the UAV in modifying the new autonomous flight path of the UAV. The velocity component may be perpendicular to the new autonomous flight path of the UAV. In some instances, the velocity component may be added along a reference plane such as a transverse plane of the UAV or along a horizontal plane. Alternatively or in addition, an acceleration component may be added to the UAV in modifying the new autonomous flight path of the UAV. The acceleration component may be perpendicular to the new autonomous flight path of the UAV. In some instances, the acceleration component may be added along a reference plane such as a transverse plane of the UAV or along a horizontal plane.

In some instances, the modification 1022 may be with respect to the original autonomous flight path 1024 as shown in embodiment 1020. For example, a direction component may be added to the original autonomous flight path. The direction component may be perpendicular to the original autonomous flight path. In some instances, the direction component may be added along a reference plane such as a transverse plane of the UAV or along a horizontal plane. Alternatively or in addition, a velocity component may be added to the UAV in modifying the new autonomous flight path of the UAV. The velocity component may be perpendicular to the original autonomous flight path of the UAV. In some instances, the velocity component may be added along a reference plane such as a transverse plane of the UAV or along a horizontal plane. Alternatively or in addition, an acceleration component may be added to the UAV in modifying the new autonomous flight path of the UAV. The acceleration component may be perpendicular to the original autonomous flight path of the UAV. In some instances, the acceleration component may be added along a reference plane such as a transverse plane of the UAV or along a horizontal plane.

In some instances, the one or more control sticks described throughout may be used in conjunction to affect operation of the UAV. For example, the one or more control sticks may be used simultaneously or in sequence. In some instances, the one or more control sticks may be used together in order to adjust autonomous flight of the UAV. In some instances, the yaw stick may be used together with the roll sticks, the pitch stick, and/or the throttle stick. In some instances, the roll stick may be used together with the pitch stick, the throttle stick, and/or the yaw stick. In some instances, the pitch stick may be used together with the throttle stick, the yaw stick, and/or the roll stick. In some instances, the throttle stick may be used together with the yaw stick, the roll stick, and/or the pitch stick. In some instances, two means of input (e.g., two control sticks) may be operated by a user to affect or change behavior of the UAV during autonomous flight. In some instances, 3, 4, 5, 6, 7, 8, 9, 10 or more means of input may be operated by a user to affect or change behavior of the UAV during autonomous flight of the UAV. The means of input may include, but are not limited to, control sticks, buttons, accelerometers, voice input devices, etc, substantially as described elsewhere. The combination of user input provided on the user terminal (e.g., on control sticks) while autonomous flight of the UAV is effected may further modify autonomous flight of the UAV in novel ways.

For example, while the UAV is under autonomous flight and flying in a certain direction (e.g., under tap-to-go operation), a user of the UAV may operate a control stick (e.g., a yaw stick) that affects rotation of the UAV around the yaw axis and a control stick (e.g., a throttle stick) that affects a height of the UAV. In such a case, the UAV may circularly ascend or descend. If the user's inputs are maintained on each of the control sticks, the UAV may spirally ascend or descend. For example, while the UAV is under autonomous flight (e.g., under tap-to-go operation), a user of the UAV may operate a control stick (e.g., a yaw stick) that affects rotation of the UAV around the yaw axis and a control stick (e.g., a pitch stick) that affects a velocity of the UAV. In such a case, a turn of the UAV may be precisely controlled. For example, while under autonomous flight, the yaw stick may be fully actuated (e.g., to the left) while the pitch stick is fully actuated to the bottom to decrease velocity of the UAV. Radius of the curvature may be further decreased than if the yaw stick was actuated.

The systems provided herein may enable users to rapidly change a trajectory of the UAV while maintaining overall autonomous control (e.g., by a flight controller) such that the UAV is able to continue in completing its objective or continue flying towards a target. Seamless transition between autonomous flight and modification of the autonomous flight may be possible such that the burden of manually piloting the aerial vehicle on the user can be significantly reduced, while still enabling a degree of control by the user when desired or advantageous. Alternatively or in addition, the different user interfaces may enable users to quickly and intuitively react to react to emergencies or unanticipated situations (e.g., by disrupting autonomous flight or modifying the autonomous flight).

The systems, devices, and methods described herein can be applied to a wide variety of movable objects. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 11:
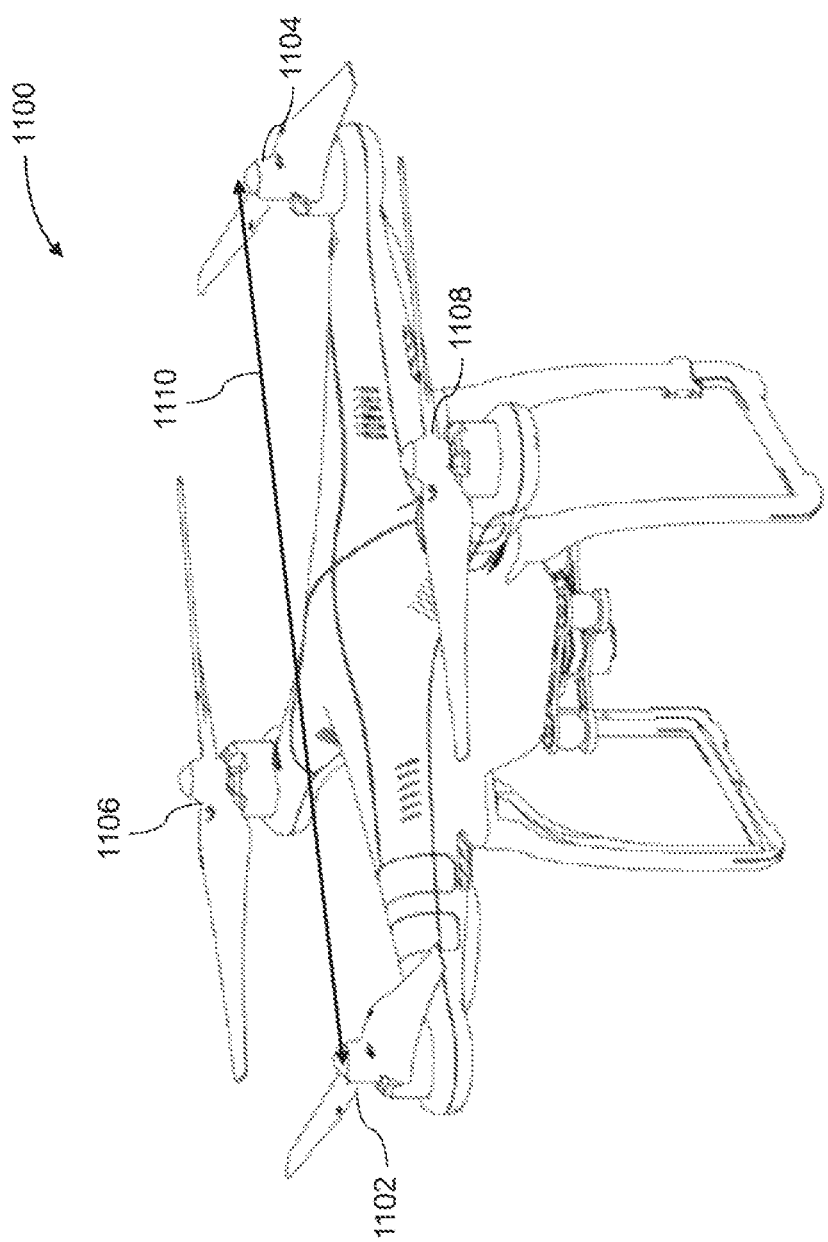
FIG. 11 illustrates an unmanned aerial vehicle (UAV), in accordance with embodiments.

FIG. 11 illustrates an unmanned aerial vehicle (UAV) 1100, in accordance with embodiments. The UAV may be an example of a movable object as described herein, to which the method and apparatus of discharging a battery assembly may be applied. The UAV 1100 can include a propulsion system having four rotors 1102, 1104, 1106, and 1108. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1110. For example, the length 1110 can be less than or equal to 2 m, or less than equal to 5 m. In some embodiments, the length 1110 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

Figure 12:
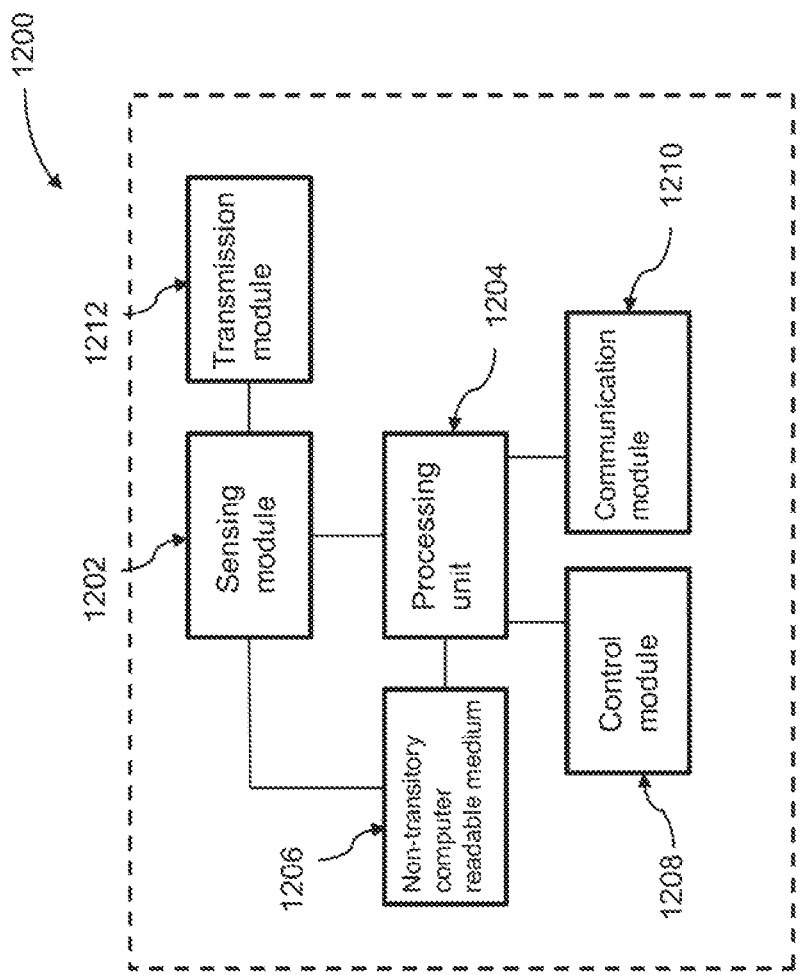
FIG. 12 is a schematic illustration by way of block diagram of a system for controlling a movable object, in accordance with embodiments.

FIG. 12 is a schematic illustration by way of block diagram of a system 1200 for controlling a movable object, in accordance with embodiments. The system 1200 can be used in combination with any suitable embodiment of the systems, devices, and methods disclosed herein. The system 1200 can include a sensing module 1202, processing unit 1204, non-transitory computer readable medium 1206, control module 1208, and communication module 1210.

The sensing module 1202 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1202 can be operatively coupled to a processing unit 1204 having a plurality of processors. In some embodiments, the sensing module can be operatively coupled to a transmission module 1212 (e.g., a Wi-Fi image transmission module) configured to directly transmit sensing data to a suitable external device or system. For example, the transmission module 1212 can be used to transmit images captured by a camera of the sensing module 1202 to a remote terminal.

The processing unit 1204 can have one or more processors, such as a programmable processor (e.g., a central processing unit (CPU)). The processing unit 1204 can be operatively coupled to a non-transitory computer readable medium 1206. The non-transitory computer readable medium 1206 can store logic, code, and/or program instructions executable by the processing unit 1204 for performing one or more steps. The non-transitory computer readable medium can include one or more memory units (e.g., removable media or external storage such as an SD card or random access memory (RAM)). In some embodiments, data from the sensing module 1202 can be directly conveyed to and stored within the memory units of the non-transitory computer readable medium 1206. The memory units of the non-transitory computer readable medium 1206 can store logic, code and/or program instructions executable by the processing unit 1204 to perform any suitable embodiment of the methods described herein. For example, the processing unit 1204 can be configured to execute instructions causing one or more processors of the processing unit 1204 to analyze sensing data produced by the sensing module. The memory units can store sensing data from the sensing module to be processed by the processing unit 1204. In some embodiments, the memory units of the non-transitory computer readable medium 1206 can be used to store the processing results produced by the processing unit 1204.

In some embodiments, the processing unit 1204 can be operatively coupled to a control module 1208 configured to control a state of the movable object. For example, the control module 1208 can be configured to control the propulsion mechanisms of the movable object to adjust the spatial disposition, velocity, and/or acceleration of the movable object with respect to six degrees of freedom. Alternatively or in combination, the control module 1208 can control one or more of a state of a carrier, payload, or sensing module.

The processing unit 1204 can be operatively coupled to a communication module 1210 configured to transmit and/or receive data from one or more external devices (e.g., a terminal, display device, or other remote controller). Any suitable means of communication can be used, such as wired communication or wireless communication. For example, the communication module 1210 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1210 can transmit and/or receive one or more of sensing data from the sensing module 1202, processing results produced by the processing unit 1204, predetermined control data, user commands from a terminal or remote controller, and the like.

The components of the system 1200 can be arranged in any suitable configuration. For example, one or more of the components of the system 1200 can be located on the movable object, carrier, payload, terminal, sensing system, or an additional external device in communication with one or more of the above. Additionally, although FIG. 12 depicts a single processing unit 1204 and a single non-transitory computer readable medium 1206, one of skill in the art would appreciate that this is not intended to be limiting, and that the system 1200 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1200 can occur at one or more of the aforementioned locations.

As used herein A and/or B encompasses one or more of A or B, and combinations thereof such as A and B. It will be understood that although the terms "first," "second," "third" etc. may be used herein to describe various elements, components, regions and/or sections, these elements, components, regions and/or sections should not be limited by these terms. These terms are merely used to distinguish one element, component, region or section from another element, component, region or section. Thus, a first element, component, region or section discussed below could be termed a second element, component, region or section without departing from the teachings of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the figures. It will be understood that relative terms are intended to encompass different orientations of the elements in addition to the orientation depicted in the figures. For example, if the element in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the element in one of the figures were turned over, elements described as "below" or "beneath" other elements would then be oriented "above" the other elements. The exemplary terms "below" or "beneath" can, therefore, encompass both an orientation of above and below.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. A system, comprising:
  a controller configured to:
    in response to a first user interface receiving a first user input, generate a first control signal, the first control signal being configured to control a movable object to effect an autonomous operation with a first parameter and a second parameter, the first parameter being associated with a process of achieving a target or a task of the autonomous operation, the second parameter being associated with the target or the task of the autonomous operation; and
    in response to a second user interface, different from the first user interface, receiving a second user input:
      generate a second control signal based on a modified first parameter and the second parameter, the second user input providing one or more instructions to modify the first parameter to obtain the modified first parameter, and the second parameter being unchanged by the second user input; and
      control the movable object to continue the autonomous operation based on the second control signal.

2. The system of claim 1, wherein the autonomous operation includes at least one of:
  a movement to a predetermined location;
  an autonomous return of the movable object;
  an autonomous navigation along one or more waypoints;
  an autonomous movement to a point of interest;
  a movement along a preset trajectory or a preset direction;
  a movement along an autonomously planned trajectory;
  a movement along a user configured trajectory;
  a movement to a tapped location on a map of the first user interface; or
  a movement tracking a target object.

3. The system of claim 1, wherein:
  the autonomous operation includes a movement of the movable object toward a first target object; and
  in response to the second user input including a distance vector from a current location of the movable object based on the autonomous operation, the controller adds the distance vector to coordinates of the current location to obtain a second target object, the second control signal being configured to control the movable object to move toward the second target object.

4. The system of claim 1, wherein:
  in response to the second user input including a velocity vector, the controller adds the velocity vector to a current velocity of the movable object, based on the autonomous operation, to obtain a new velocity, the second control signal being configured to control the movable object to operate based on the new velocity; or
  in response to the second user input including an acceleration vector, the controller adds the acceleration vector to a current acceleration of the movable object, based on the autonomous operation, to obtain a new acceleration, the second control signal being configured to control the movable object to operate based on the new acceleration.

5. The system of claim 1, wherein:
  the second user input includes a force intensity of a force applied by a user on the second user interface; and
  a modification level of the first parameter is proportional to the force intensity.

6. The system of claim 1, wherein:
the second user input includes a period of the second user input applied on the second user interface; and
a modification level of the first parameter is proportional to the period.

7. The system of claim 1, wherein:
the controller is further configured to generate a third control signal, the third control signal being configured to control the movable object to move according to a trajectory before the second control signal is generated.

8. The system of claim 1, wherein:
in response to receiving a third user input, the controller generates a third control signal to terminate the autonomous operation.

9. The system of claim 1, wherein:
at least during a duration of the second user input, the controller controls the movable object to operate based on the second control signal.

10. The system of claim 1, wherein:
in response to determining that the second control signal causes the movable object to move to a distance greater than a threshold distance from an autonomous operation trajectory, the controller controls the movable object to:
move based on the threshold distance;
return to the autonomous operation trajectory associated with the first user input; or
hover at a location where the distance threshold is reached.

11. The system of claim 10, wherein:
in response to determining that the movable object reaches the threshold distance, the controller generates a warning signal.

12. The system of claim 1, wherein:
in response to determining that the second control signal causes the movable object to move away from an autonomous operation trajectory, associated with the first user input, for a time duration greater than a threshold time, the controller generates a warning signal.

13. The system of claim 1, wherein after the second user input is received and released, the movable object is configured to:
move according to an autonomous operation trajectory, based on the first user input, prior to the second user input; or
move according to a new operation trajectory different from the autonomous operation trajectory.

14. The system of claim 1, wherein:
the controller is carried by the movable object; and
the first user interface and the second user interface are arranged on one or more devices different from the movable object.

15. The system of claim 1, wherein:
the first user interface is arranged on a first device, and the second user interface is arranged on a second device different from the first device; and
the first device is operably coupled to the second device.

16. The system of claim 1, wherein:
the controller is configured to modify the first parameter according to environmental information associated with the first parameter.

17. The system of claim 16, wherein:
the movable object includes one or more sensors configured to determine the environmental information.

18. The system of claim 1, wherein:
the first parameter includes at least one of a movement direction of the movable object, a movement trajectory of the movable object, an altitude of the movable object, a velocity of the movable object, or an acceleration of the movable object; and
the second parameter includes a destination or a tracking target of the autonomous operation of the movable object.

19. A controlling method for a movable object, comprising:
in response to receiving a first user input at a first user interface, generating a first control signal, the first control signal being configured to control the movable object to effect an autonomous operation with a first parameter and a second parameter, the first parameter being associated with a process of achieving a target or a task of the autonomous operation, the second parameter being associated with the target or the task of the autonomous operation; and
in response to receiving a second user input at a second user interface different from the first user interface:
generating a second control signal based on a modified first parameter and the second parameter, the second user input providing one or more instructions to modify the first parameter to obtain the modified first parameter, and the second parameter being unchanged by the second user input; and
controlling the movable object to continue the autonomous operation based on the second control signal.

20. A non-transitory computer-readable storage medium for storing computer-executable instructions to be executed by one or more hardware processors to:
in response to a first user interface receiving a first user input, generate a first control signal, the first control signal being configured to control a movable object to effect an autonomous operation with a first parameter and a second parameter, the first parameter being associated with a process of achieving a target or a task of the autonomous operation, the second parameter being associated with the target or the task of the autonomous operation; and
in response to a second user interface, different from the first user interface, receiving a second user input:
generate a second control signal based on a modified first parameter and the second parameter, the second user input providing one or more instructions to modify the first parameter to obtain the modified first parameter, and the second parameter being unchanged by the second user input; and
control the movable object to continue the autonomous operation based on the second control signal.

* * * * *